United States Patent
Ishikawa et al.

(10) Patent No.: US 10,657,661 B2
(45) Date of Patent: May 19, 2020

(54) INFORMATION PROCESSING APPARATUS, IMAGING SYSTEM, INFORMATION PROCESSING METHOD, AND PROGRAM CAUSING COMPUTER TO EXECUTE INFORMATION PROCESSING

(75) Inventors: Ryo Ishikawa, Kawasaki (JP); Takaaki Endo, Urayasu (JP); Kiyohide Satoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 877 days.

(21) Appl. No.: 13/429,153

(22) Filed: Mar. 23, 2012

(65) Prior Publication Data
US 2012/0253171 A1   Oct. 4, 2012

(30) Foreign Application Priority Data
Apr. 1, 2011 (JP) ................................ 2011-081993

(51) Int. Cl.
*G06T 7/33* (2017.01)

(52) U.S. Cl.
CPC ...... *G06T 7/33* (2017.01); *G06T 2207/10081* (2013.01); *G06T 2207/10088* (2013.01); *G06T 2207/10132* (2013.01); *G06T 2207/30008* (2013.01)

(58) Field of Classification Search
USPC ........ 600/411, 439, 407, 424, 413; 324/306, 324/309; 382/128
See application file for complete search history.

(56) References Cited

U.S. PATENT DOCUMENTS

| | | | |
|---|---|---|---|
| 6,405,072 B1* | 6/2002 | Cosman | 600/426 |
| 6,775,404 B1 | 8/2004 | Pagoulatos et al. | |
| 2005/0033160 A1 | 2/2005 | Yamagata et al. | |
| 2007/0010743 A1 | 1/2007 | Arai | |

(Continued)

FOREIGN PATENT DOCUMENTS

| | | |
|---|---|---|
| CN | 101336843 A | 1/2009 |
| CN | 101681504 A | 3/2010 |

(Continued)

OTHER PUBLICATIONS

Nicolau, et al., "A structured light system to guide percutaneous punctures in interventional radiology," Proc. SPIE 7000, Optical and Digital Image Processing, 700016 (Apr. 25, 2008); doi: 10.1117/12.780615.*

(Continued)

*Primary Examiner* — Christopher L Cook
(74) *Attorney, Agent, or Firm* — Canon U.S.A., Inc. IP Division

(57) ABSTRACT

An information processing apparatus includes a first acquisition unit configured to acquire a plurality of positions, in a three-dimensional image of a subject, obtained based on a sternum of the subject, a second acquisition unit configured to acquire a plurality of positions, in the subject, obtained based on the sternum of the subject, and a calculation unit configured to calculate a correspondence relationship in position between the subject and the three-dimensional image based on the plurality of positions acquired by the first acquisition unit and the plurality of positions acquired by the second acquisition unit.

12 Claims, 13 Drawing Sheets

(56) References Cited

U.S. PATENT DOCUMENTS

| | | | | |
|---|---|---|---|---|
| 2008/0212737 A1* | 9/2008 | D'Souza | ............... | A61N 5/1049 |
| | | | | 378/65 |
| 2009/0262998 A1* | 10/2009 | Wang | ................... | G06F 19/321 |
| | | | | 382/131 |
| 2009/0281417 A1* | 11/2009 | Hartmann | ............... | A61B 34/20 |
| | | | | 600/424 |
| 2014/0193053 A1* | 7/2014 | Kadoury | ............... | G06T 11/008 |
| | | | | 382/131 |

FOREIGN PATENT DOCUMENTS

| | | |
|---|---|---|
| EP | 1847294 A1 | 10/2007 |
| JP | 2010131269 A | 6/2010 |
| WO | 2010/055816 A1 | 5/2010 |

OTHER PUBLICATIONS

Hostettler et al., A real-time predictive simulation of abdominal viscera positions during quiet free breathing, Progress in Biophysics and Molecular Biology 103 (2010) 169-184.*

Spinczyk et al., Methods for abdominal respiratory motion tracking. Computer Aided Surgery. 2014;19(1-3):34-47. doi:10.3109/10929088.2014.891657.*

Wein et al.,"Automatic CT-ultrasound Registration for Diagnostic Imaging and Image-Guided Intervention" Medical Image Analysis, Jun. 10, 2008, pp. 577-585, vol. 12.

* cited by examiner

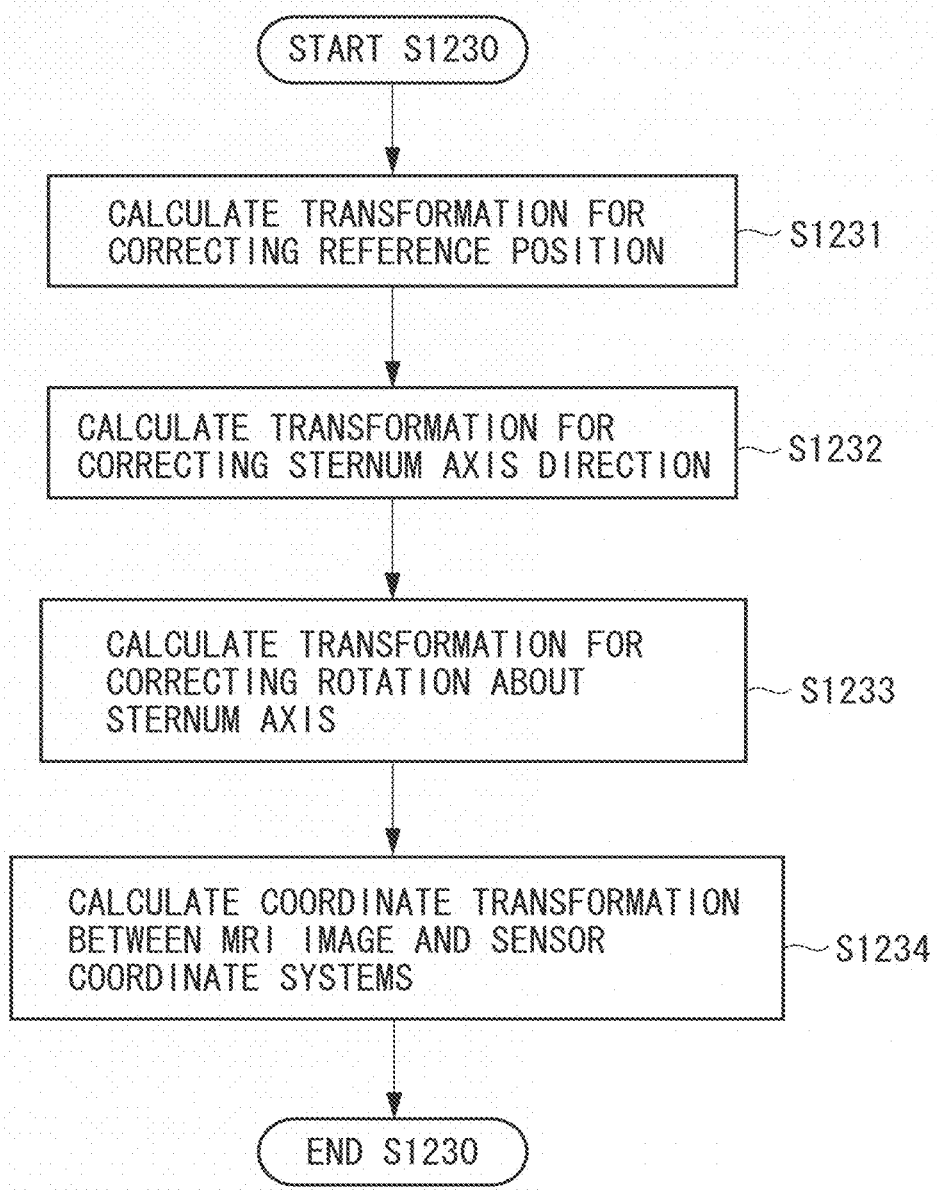

INFORMATION PROCESSING APPARATUS, IMAGING SYSTEM, INFORMATION PROCESSING METHOD, AND PROGRAM CAUSING COMPUTER TO EXECUTE INFORMATION PROCESSING

TECHNICAL FIELD

The present disclosure relates to an information processing apparatus processing medical images captured by various medical imaging apparatuses, an information processing method, a program for causing a computer to execute information processing, and an imaging system capturing medical images.

BACKGROUND

Images acquired by medical imaging apparatuses (modalities) are used to inspect patients or examine affected regions thereof. Examples of such modalities used in the medical field include a simple X-ray imaging apparatus, an X-ray computed tomography (X-ray CT) imaging apparatus, a magnetic resonance imaging (MRI) apparatus, and an ultrasonic (US) imaging apparatus, among others.

By associating these images acquired by a plurality of different modalities, medical practitioners can examine a single region of a subject with a plurality of different types of images. For example, if an MRI tomographic image corresponding to an ultrasonic image captured by an ultrasonic imaging apparatus is acquired from a previously captured three-dimensional (3D) MRI image, doctors can give a diagnosis while comparing both images.

As a technique for realizing the above-described process, US2007/0010743 discusses acquiring the correspondence relationship between an ultrasonic image and an MRI image by setting the positional relationship between the reference object of a position sensor and a bed on which a patient lies and specifying a single predetermined point on a body surface with an ultrasonic probe having the position sensor. In this technique if the patient changes his/her direction or orientation on the bed, an error may be caused.

SUMMARY

According to an aspect of a present embodiment, an information processing apparatus includes a first acquisition unit configured to acquire a plurality of positions in a three-dimensional image of a subject obtained based on a sternum of the subject, a second acquisition unit configured to acquire a plurality of positions in the subject obtained based on the sternum of the subject, and a calculation unit configured to calculate a correspondence relationship in position between the subject and the three-dimensional image based on the plurality of positions acquired by the first acquisition unit and the plurality of positions acquired by the second acquisition unit.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the embodiments.

FIG. 13 is a flow chart illustrating a coordinate transformation calculation process according to the third exemplary embodiment in detail.

DESCRIPTION OF THE EMBODIMENTS

Various exemplary embodiments, features, and aspects will be described in detail below with reference to the drawings.

Figure 1:
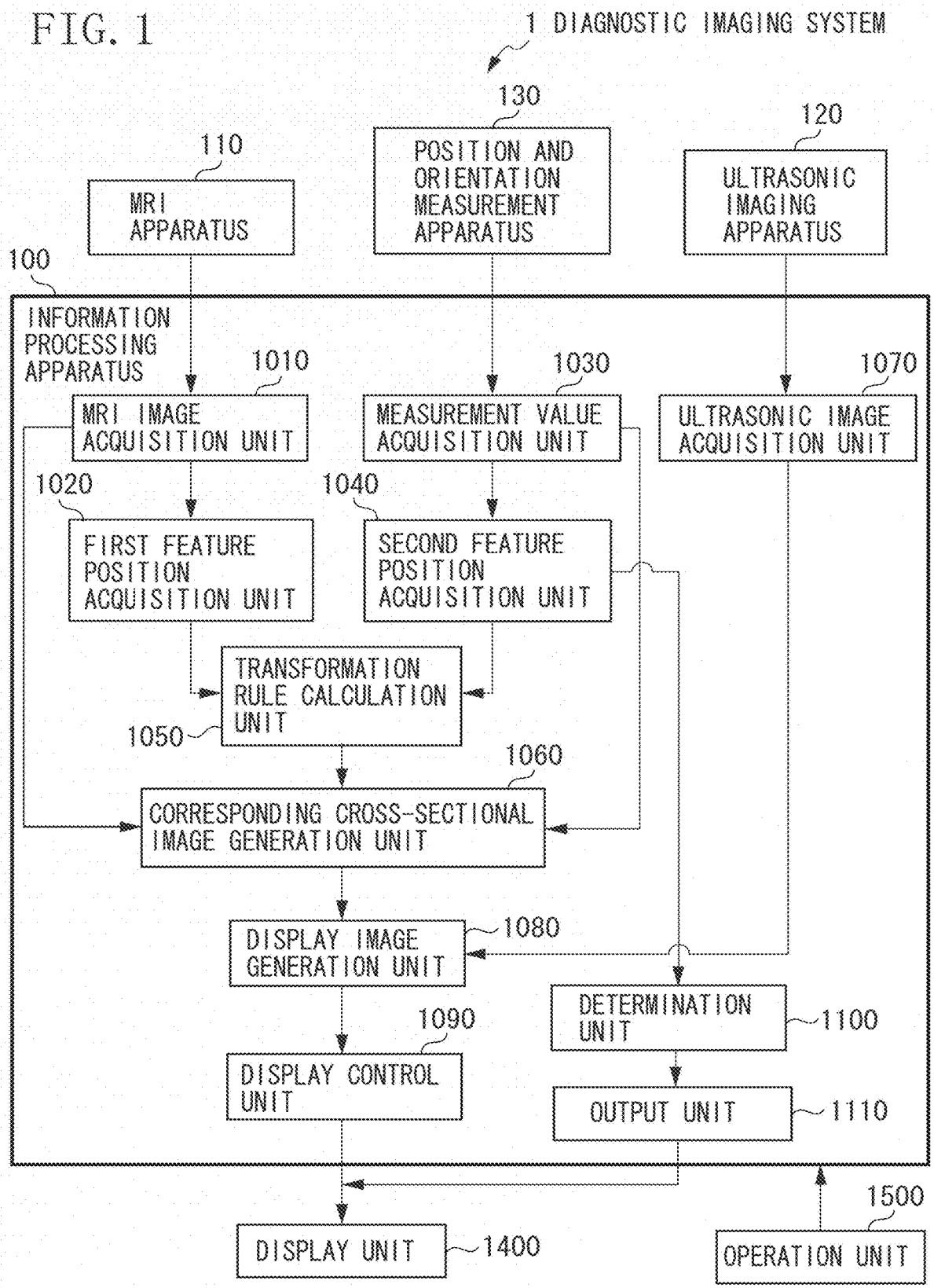
FIG. 1 is a view illustrating a configuration of a diagnostic imaging system according to a first exemplary embodiment of the present invention.

FIG. 1 illustrates a configuration of a diagnostic imaging system 1 according to a first exemplary embodiment. The diagnostic imaging system 1 includes an information processing apparatus 100, an MRI apparatus 110, an ultrasonic imaging apparatus 120, a position and orientation measurement apparatus 130, a display unit 1400, and an operation unit 1500.

The MRI apparatus 110 uses a nuclear magnetic resonance (NMR) method to acquire information about a 3D region inside a subject (e.g., a human body). Namely, the MRI apparatus 110 acquires an MRI image. In the MRI image, a coordinate system (an MRI image coordinate system) is defined as a reference, and the 3D region information in the coordinate system is represented by a plurality of pixels.

The ultrasonic imaging apparatus 120 captures an ultrasonic image of the inside of the subject when an ultrasonic probe (shown in FIG. 3) transmitting and receiving ultrasonic waves is brought into contact with the subject. In the present exemplary embodiment, the ultrasonic imaging apparatus 120 captures a two-dimensional (2D) B-mode ultrasonic image that shows a cross sectional region of the subject.

The position and orientation measurement apparatus 130 measures the position and orientation of the ultrasonic probe in the 3D space. To that end, the position and orientation measurement apparatus 130 may be implemented, for example, by mounting a magnetic or optical six-degree-of-freedom measurement apparatus on the ultrasonic probe. The position and orientation of the ultrasonic probe is indicative of the relative position and orientation relationship between a coordinate system (probe coordinate system) defined as a reference by the ultrasonic probe and a coordinate system (sensor coordinate system) defined as a reference by the position and orientation measurement apparatus 130.

In the probe coordinate system, the origin is the center of the ultrasonic probe imaging surface (the surface brought into contact with the subject), and the Y axis is represented by the direction in which the ultrasonic beam is emitted from the ultrasonic probe. In addition, the X axis is represented by the direction that is included on the imaging surface of the ultrasonic image captured by the ultrasonic imaging apparatus 120 and that is perpendicular to the Y axis. The Z axis is represented by the cross product direction of the X axis and the Y axis. The probe coordinate system is a 3D orthogonal coordinate system defined as described above by the X, Y, and Z axes. The sensor coordinate system is an orthogonal coordinate system defined as a reference by the position and orientation measurement apparatus 130. For example, a measurement station (not illustrated) fixedly installed in the 3D space in which measurement is executed is used as a reference.

The information processing apparatus 100 includes an MRI image acquisition unit 1010, a first feature position acquisition unit 1020, a measurement value acquisition unit 1030, a second feature position acquisition unit 1040, a transformation rule calculation unit 1050, a corresponding cross-sectional image generation unit 1060, an ultrasonic image acquisition unit 1070, a display image generation unit 1080, a display control unit 1090, a determination unit 1100, and an output unit 1110.

The MRI image acquisition unit 1010 acquires an MRI image of the subject captured by the MRI apparatus 110. The first feature position acquisition unit 1020 acquires body surface positions near the subject sternum and ribs rendered in the MRI image acquired by the MRI image acquisition unit 1010, as position coordinates based on the sternum and ribs in the MRI image coordinate system (first coordinate system).

After the position and orientation measurement apparatus 130 measures values of the position and orientation of the ultrasonic probe, the measurement value acquisition unit 1030 acquires the values as a 4×4 rigid transformation matrix represented by translation and rotation. The measurement values are represented in the sensor coordinate system as a reference. The second feature position acquisition unit 1040 uses the measured values acquired by the measurement value acquisition unit 1030 and acquires body surface positions near the subject sternum and ribs, as position coordinates based on the subject sternum and ribs in the sensor coordinate system (second coordinate system).

The transformation rule calculation unit 1050 calculates a position coordinate transformation rule between the sensor coordinate system and the MRI image coordinate system, based on the information acquired by the first and second feature position acquisition units 1020 and 1040. Namely, the transformation rule calculation unit 1050 calculates the correspondence relationship in position between the subject and the 3D image.

The corresponding cross-sectional image generation unit 1060 generates a corresponding cross-sectional image, based on the information about the ultrasonic probe position and orientation acquired by the measurement value acquisition unit 1030, the transformation rule calculated by the coordinate transformation calculation unit 1050, and the MRI image acquired by the MRI image acquisition unit 1010. The corresponding cross-sectional image is a segmented image from the MRI image, and the segmented image corresponds to the subject region photographed by the ultrasonic probe.

The ultrasonic image acquisition unit 1070 acquires an ultrasonic image of the inside of the subject captured by the ultrasonic imaging apparatus 120. The display image generation unit 1080 generates a display image, based on the corresponding cross-sectional image generated by the corresponding cross-sectional image generation unit 1060 and the ultrasonic image acquired by the ultrasonic image acquisition unit 1070.

The display control unit 1090 causes the display unit 1400 to display the generated display image. The determination unit 1100 determines whether the subject position acquired by the second feature position acquisition unit 1040 is sufficient or accurate for the transformation rule calculation unit 1050 to calculate an accurate transformation rule. If the position is insufficient or inappropriate, the output unit 1110 causes the display unit 1400 to display a warning message. The display unit 1400 may output sound or the like, instead of displaying a warning message.

Figure 2:
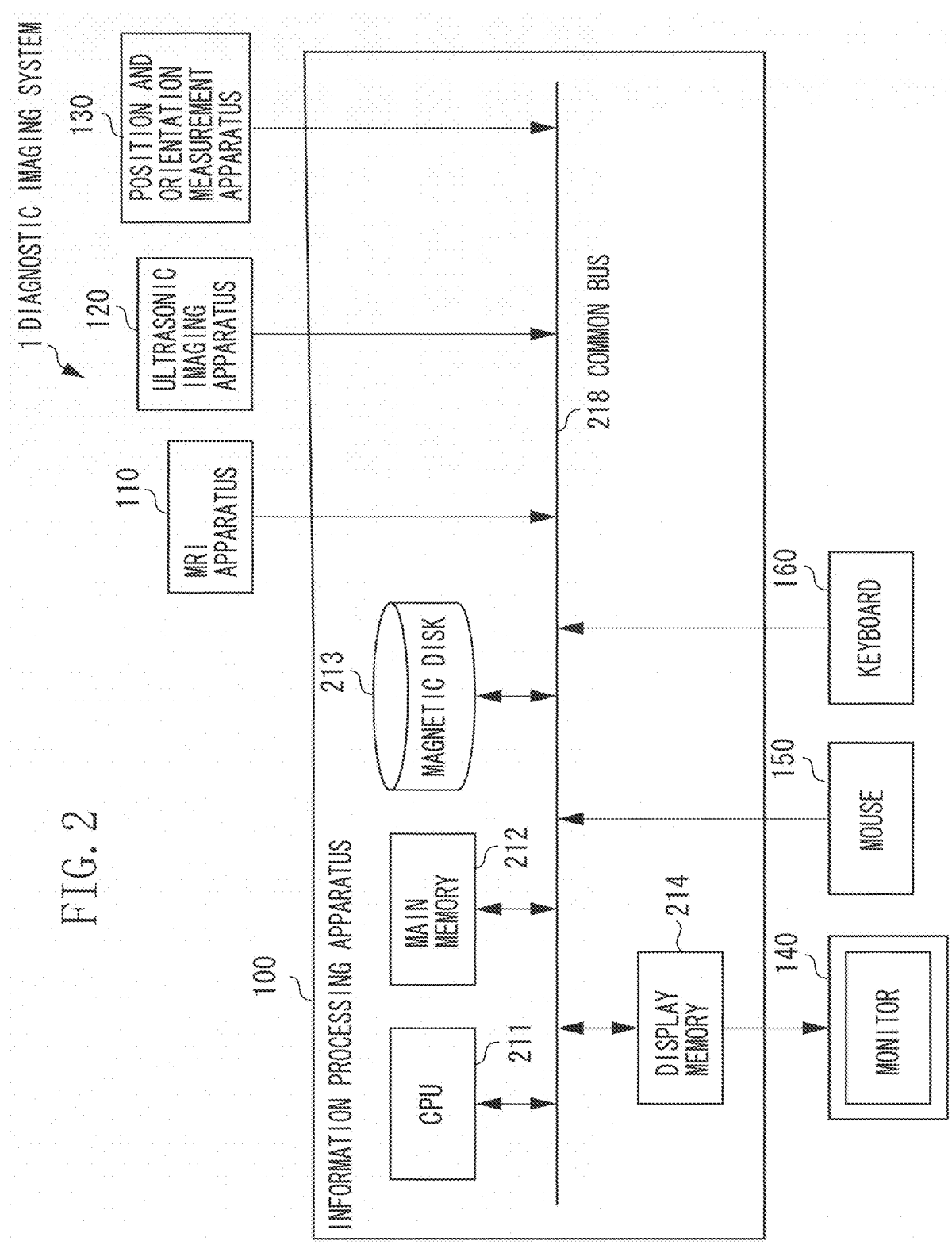
FIG. 2 is a view illustrating a hardware configuration of the diagnostic imaging system.

FIG. 2 illustrates a hardware configuration of the diagnostic imaging system 1 according to the first exemplary embodiment. The diagnostic imaging system 1 according to the first exemplary embodiment includes the information processing apparatus 100, the MRI apparatus 110, the ultrasonic imaging apparatus 120, the position and orientation measurement apparatus 130, a monitor 140, a mouse 150, and a keyboard 160.

The information processing apparatus 100 includes a central processing unit (CPU) 211, a main memory 212, a magnetic disk 213, and a display memory 214. In addition, the information processing apparatus 100 is connected to the monitor 140, the mouse 150, and the keyboard 160. These components are connected to communicate with each other via a common bus 218.

The CPU 211 may be implemented as a single main processor, an array of dedicated microprocessors or a combination thereof. Vector or array processing may be implemented by an array of dedicated microprocessors; this can advantageous for parallel processing of data-intensive images, but may be complicated and costly to implement in terms of hardware. On the other hand, a single main processor may be easier to implement. In any case, the CPU 211 mainly controls operations of each of the components of the information processing apparatus 100. The main memory 212 stores a program for realizing processes in the flow charts illustrated in FIGS. 5 and 6. In addition, the main memory 212 provides a work area when the CPU 211 executes the program. The magnetic disk 213 stores, for example, various types of application software including an operating system (OS), a peripheral equipment device drive, and programs for executing the processes described below.

The display memory 214 temporarily stores data displayed on the monitor 140. For example, the monitor 140 is a cathode-ray tube (CRT) monitor or a liquid crystal monitor and displays an image based on data supplied from the display memory 214. For example, the mouse 150 inputs information pointed by a user and the keyboard 160 inputs text or commands entered by a user.

When the CPU 211 loads and executes a program stored in the main memory 212, the hardware and software of the information processing apparatus 100 functions in cooperation. As a result, the information processing apparatus 100 realizes the above functions as illustrated in FIG. 1. For example, the monitor 140 functions as the display unit 1400. In addition, the information processing apparatus 100 realizes the processes illustrated in FIGS. 5 and 6.

Figure 3:
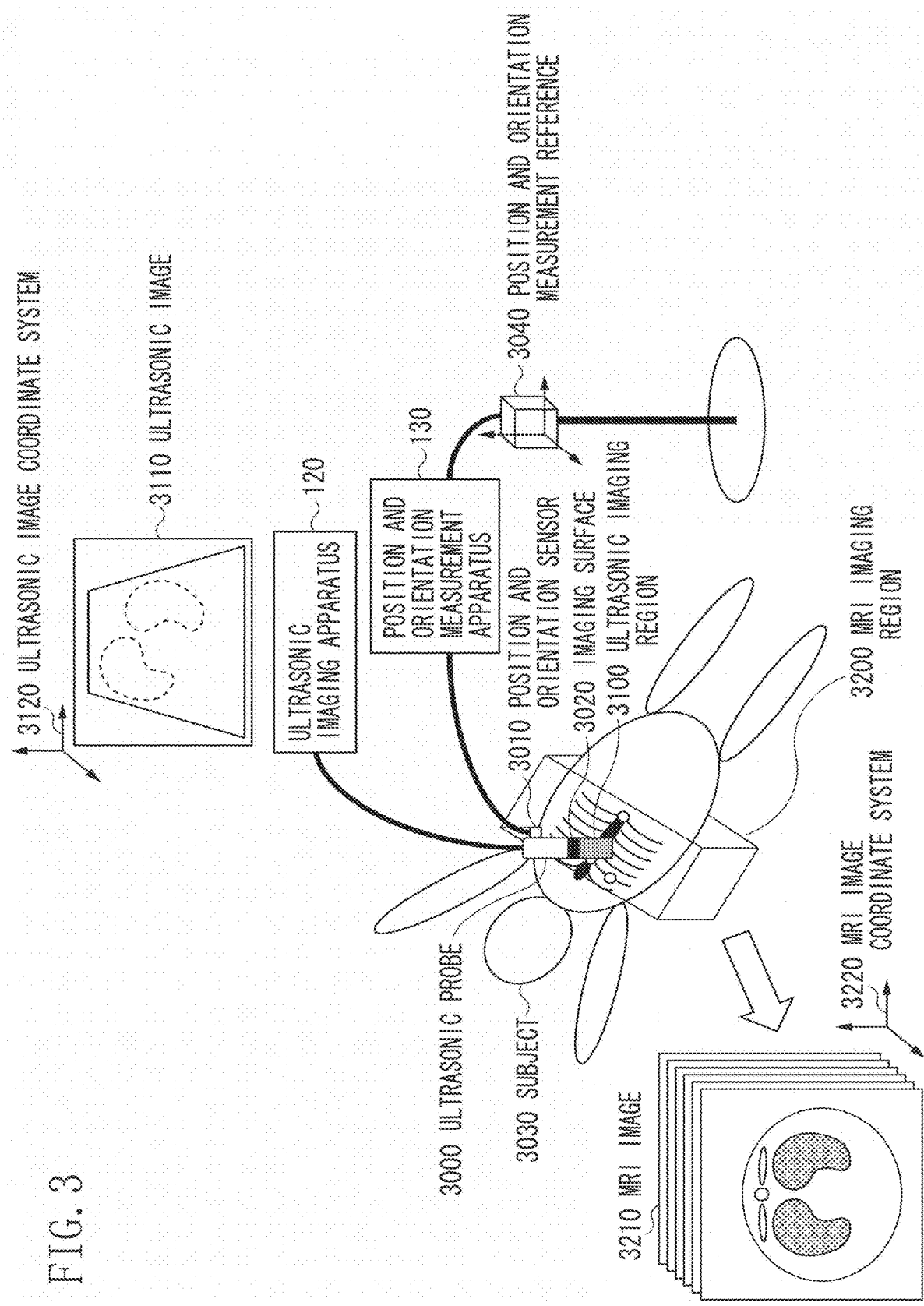
FIG. 3 is a view illustrating imaging functions of the diagnostic imaging system.

Next, imaging functions of the diagnostic imaging system 1 will be described with reference to FIG. 3. The ultrasonic imaging apparatus 120 includes an ultrasonic probe 3000 having an imaging surface 3020. The ultrasonic imaging apparatus 120 captures an ultrasonic image of a subject 3030, by bringing the imaging surface 3020 into contact with the subject 3030 and acquiring a signal from the subject 3030 via the imaging surface 3020.

A position and orientation sensor 3010 of the position and orientation measurement apparatus 130 is fixedly mounted on the ultrasonic probe 3000. In this way, the position and orientation measurement apparatus 130 uses a position and orientation measurement reference 3040 as a reference and measures the position and orientation of the ultrasonic probe 3000.

The inspector captures two types of images, that is, ultrasonic and MRI images, from the subject 3030. More specifically, the inspector captures an ultrasonic image from the subject 3030 while holding the ultrasonic probe 3000 of the ultrasonic imaging apparatus 120 on a body surface of the subject 3030. As a result, the inspector can acquire an ultrasonic image 2110 of the subject 3030 covering an ultrasonic imaging region 3100. When the inspector brings the ultrasonic probe 3000 into contact with a body surface, the ultrasonic imaging region 3100 represents a tomographic image of a corresponding internal portion of the subject 3030.

For this ultrasonic image 3110, an ultrasonic image coordinate system 3120 is defined. In this coordinate system, for example, the origin is the position of a top left pixel of the ultrasonic image 3110, the X axis is represented by the horizontal direction, the Y axis is represented by the vertical direction, and the Z axis is represented by the cross product direction of the X and Y axes.

The position and orientation measurement apparatus 130 acquires the position and orientation of the ultrasonic probe 3000 as measurement values, by using the position and orientation measurement reference 3040 as a reference. In this way, the position and orientation of the ultrasonic imaging region 3100 defined by the ultrasonic probe 3000 are also acquired as measurement values, based on the position and orientation measurement reference 3040 as a reference. The relationship between the coordinate system (sensor coordinate system) using the position and orientation measurement reference 3040 as a reference and the ultrasonic image coordinate system is uniquely determined based on measurement results obtained by the position and orientation measurement apparatus 130.

When capturing an MRI image, a user sets an imaging region 3200 of the MRI apparatus 120. The user can capture a plurality of MRI images 3210 of the subject 3030 in the imaging region 3200. Each of these MRI images 3210 is a 3D image showing a 3D structure of the subject 3200.

In the MRI image, the MRI image coordinate system 3220 is defined. This coordinate system is used as a reference by the MRI apparatus 120, for example. If the relationship between the MRI image coordinate system 3220 and the sensor coordinate system can be obtained, the relationship between the MRI image coordinate system 3220 and the ultrasonic image coordinate system 3120 can also be obtained. Consequently, images of the inside of the subject 3030 that are rendered in the MRI image 3210 and the ultrasonic image 3110 can be aligned, compared, and examined.

Figure 4:
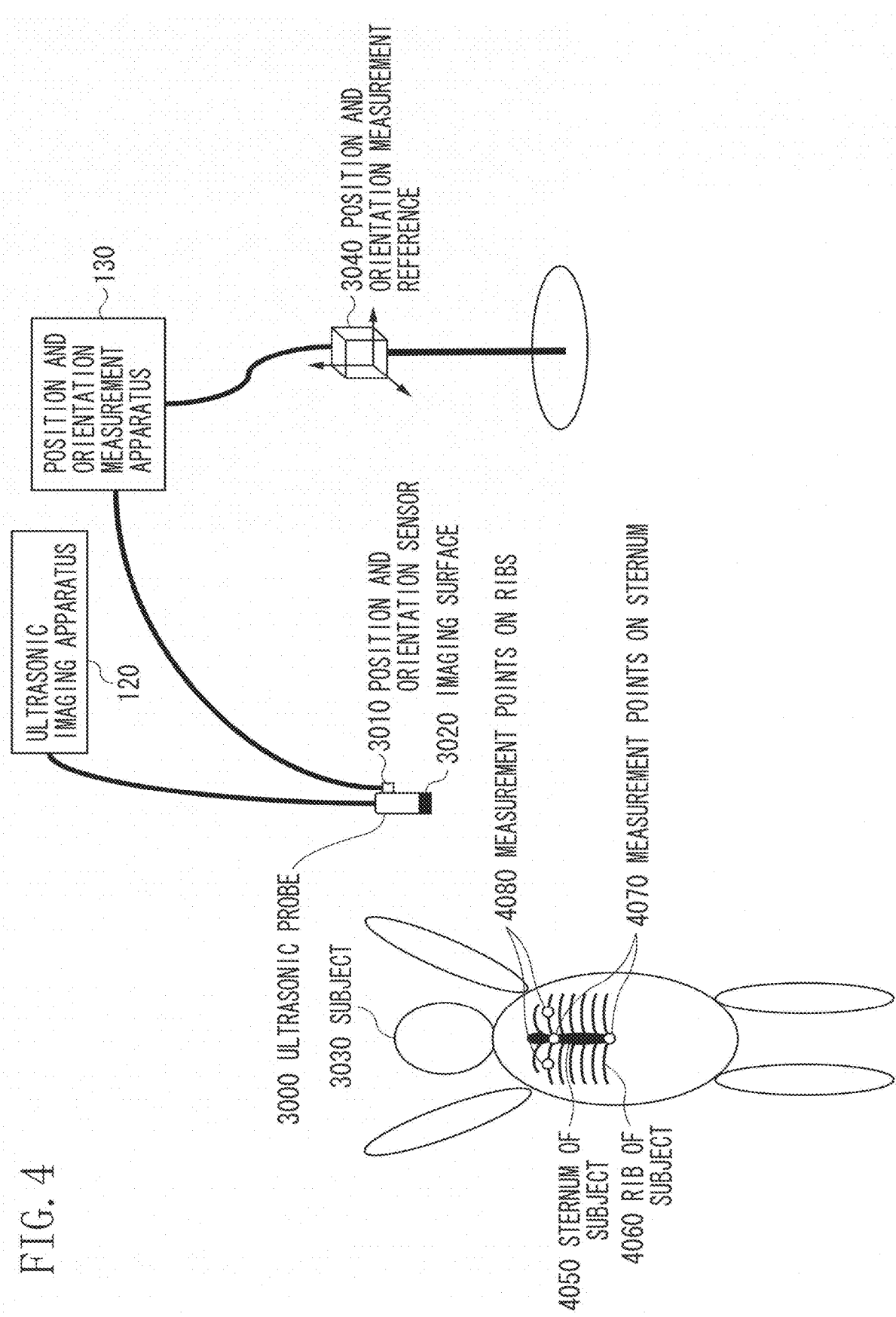
FIG. 4 is a view illustrating subject position measurement functions of the diagnostic imaging system.

An overview of measurement processing for obtaining the relationship between the MRI image coordinate system 3220 and the sensor coordinate system will be described with reference to FIG. 4. First, the information processing apparatus 100 acquires body surface positions near the sternums and ribs of a subject (human body), in each of the MRI image coordinate system (first coordinate system) and the sensor coordinate system (second coordinate system). Next, based on the acquired positions, the information processing apparatus 100 calculates the coordinate transformation between the coordinate systems.

A sternum 4050 and ribs 4060 exist inside the subject 3030. The inspector brings the imaging surface 3020 of the ultrasonic probe 3000 into contact with at least two measurement points 4070 near the sternum of the subject 3030 and at least two measurement points 4080 near the ribs of the subject 3030. Next, the position and orientation measurement apparatus 130 measures the position and orientation of the imaging surface 3020. In this way, the position and orientation measurement apparatus 130 measures the positions of the measurement points 4070 and 4080 near the sternum and ribs of the subject 3030 based on the position and orientation measurement reference 3040 as a reference.

It is desirable that such body surface positions near the sternum be measured. This is because, when identifying a position of a subject non-invasively from the outside of the body with the ultrasonic probe 3000 or the like, the inspector can easily specify the position of the sternum. In addition, even if the subject changes the orientation between lying on his/her back and lying on his/her stomach, the position of the sternum is not easily changed. In particular, when the inspector gives a diagnosis on the breast region, it is desirable that the sternum be used, since the position of the sternum is near the breast region and the inspector can accurately specify the position of the sternum. In addition, a body surface position near the sternum at the base of the second ribs can especially accurately be specified even from the outside of the body, and measurement of such position causes little burden on the subject. In addition, since a body surface position near the stomach (lower sternum end) can also be specified easily and accurately, such position is another desirable position to be measured.

Positions near the ribs can also be measured easily from the outside of the subject body. In addition, since measurement of such positions is less susceptible to change of the orientation of the subject, the positions near the ribs can suitably be used for alignment with a 3D image. In particular, assuming that right and left ribs are approximately symmetrical about the body axis of the subject, the inspector can specify points near a pair of right and left ribs that are symmetrical about the sternum. In this way, alignment accuracy can be improved. In addition, the inspector can specify the positions easily. Specifying such positions near the ribs is only an example in the first exemplary embodiment. Another example where the inspector does not specify the positions of the ribs will be described below.

By acquiring the correspondence relationship between the subject positions acquired as described above and positions specified by an MRI image, the information processing apparatus 100 can obtain a corresponding region (corresponding cross section) between an ultrasonic image captured by the ultrasonic probe and an MRI image corresponding to the ultrasonic image. Thus, by using both MRI and ultrasonic images, the inspector can accurately and effectively give a diagnosis on the breast region, such as on the lungs or the breast.

Figure 5:
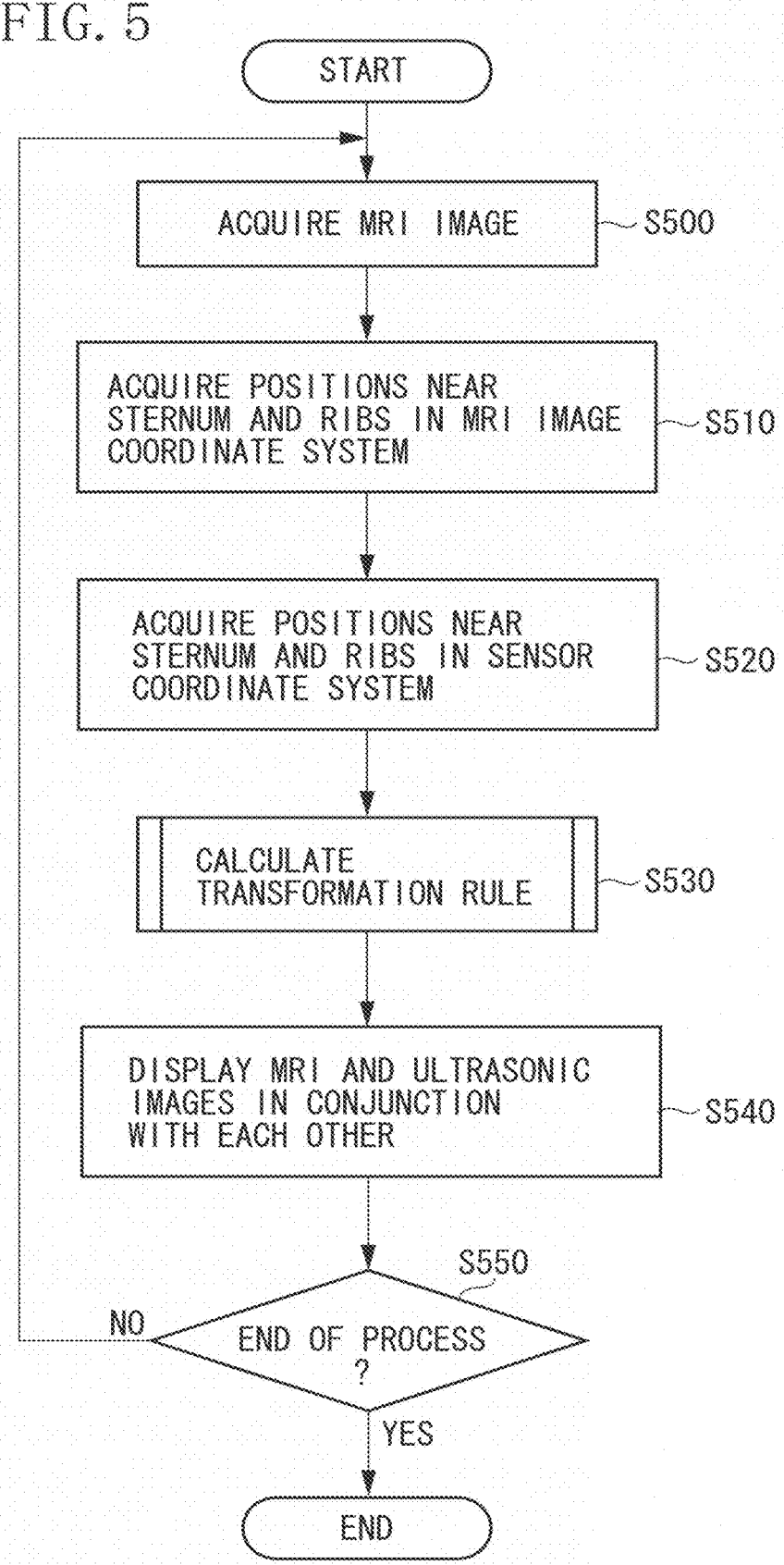
FIG. 5 is a flowchart illustrating a process executed by the diagnostic imaging system according to the first exemplary embodiment.

Next, a process executed by the information processing apparatus 100 will be described with reference to the flow chart in FIG. 5. As described above, the CPU 211 realizes the process by executing a program that is stored in the main memory 212 and that realizes the functions of the components. In addition, results of each of the steps executed by the information processing apparatus 100 will be stored and recorded in the main memory 212.

In addition, regardless of the process step, the measurement value acquisition unit 1030 sequentially acquires values of the ultrasonic probe position and orientation measured by the position and orientation measurement apparatus 130. The measurement value acquisition unit 1030 stores the information about the values and outputs updated measurement results in response to requests from other processing units. In addition, regardless of the process step, the ultrasonic image acquisition unit 1070 also sequentially acquires ultrasonic images captured by the ultrasonic imaging apparatus 120. The ultrasonic image acquisition unit 1070 stores the information about the images and outputs updated ultrasonic images in response to requests from other processing units.

In step S500, the MRI apparatus 110 photographs the subject, and the MRI image acquisition unit 1010 acquires a 3D MRI image. The MRI image is formed by a plurality of pixels, and each of the pixels has a luminance value and positional information. The position of each pixel is represented by 3D position coordinates in the coordinate system (MRI image coordinate system) used by the MRI image as a reference.

In step S510, the first feature position acquisition unit 1020 acquires body surface positions near the sternum and ribs of the subject rendered in the MRI image, as positions in the MRI image coordinate system. These body surface positions near the sternum and ribs of the subject are, for example, positions spatially closest to the sternum and rib surface positions, among the body surfaces of the subject. Body surface positions near upper and lower sternum ends of the subject can be used as the body surface positions near the sternum. In addition, for example, body surface positions near the left and right second ribs of the subject can be used as the body surface positions near the ribs. However, the body surface positions near the ribs are not necessarily the body surface positions near the second ribs of the subject. For example, body surface positions near arbitrary ribs such as the first or third ribs of the subject may be used. However, it is desirable that the same ribs as those used in step S520 be used.

For example, the first feature position acquisition unit 1020 can acquire these body surface positions near the sternum and ribs as follows. First, the information processing apparatus 100 causes the monitor 140 to display an arbitrary segmented cross-sectional image, such as an axial image, a sagittal image, or a coronal image of the MRI image. Next, the user operates the mouse 150, the keyboard 160, or the like, to switch the position or orientation of the cross-sectional image. Next, the user operates the mouse 150 or the like to specify the body surface positions near the sternum and ribs rendered in the cross-sectional image, and the first feature position acquisition unit 1020 acquires the specified positions. Based on the position and orientation of the cross-sectional image and the positions specified by the user in the cross-sectional image, the first feature position acquisition unit 1020 calculates the body surface positions near the sternum and ribs in the MRI image coordinate system.

In the above description, the user operates the mouse 150 or the like to specify the body surface positions near the sternum and ribs in the MRI image, and the first feature position acquisition unit 1020 acquires the specified positions. However, the first exemplary embodiment is not limited to such example. For example, after the user operates the mouse 150 or the like and specifies the positions of the sternum and ribs, the first feature position acquisition unit 1020 may acquire information about the positions. Next, the first feature position acquisition unit 1020 may execute image processing or the like to calculate the body surface positions near the positions. For example, image processing may be executed on the MRI image, and the shape of the subject body surface may be extracted as a dense point group or the like. In this way, the first feature position acquisition unit 1020 can select points near the positions specified by the user from the point group.

The information processing apparatus 100 records the body surface position near the upper sternum end (at the base of the second ribs) that is in the MRI image coordinate system and that is acquired in step S510, as $p_{M1}$. Likewise, the information processing apparatus 100 records the body surface position near the lower sternum end, as $p_{M2}$. In addition, the information processing apparatus 100 records the body surface positions near the left and right second ribs, as $p_{M3}$ and $p_{M4}$, respectively. It is desirable that the positions $p_{M3}$ and $p_{M4}$ be symmetrical about the body axis of the subject. The grounds for this will be described in detail when step S533 is described below. The information processing apparatus 100 may record these four positions $p_{M1}$ to $p_{M4}$ in the order in which the user specifies the positions. Alternatively, the information processing apparatus 100 may record the positions in an arbitrary order, based on the instructions input to the keyboard 160 by the user. The information processing apparatus 100 records the positions $p_{M1}$ to $p_{M4}$ as extended vectors representing positions in the 3D space. If all the positions of the four points are entered, the operation proceeds to step S520.

In the above description, the body surface positions near the subject sternum and ribs are acquired based on input operations by the user. However, the first exemplary embodiment is not limited to such example. For example, the above data may be previously stored in an external recording device or the like. In this way, if the user inputs the data to the information processing apparatus 100, the first feature position acquisition unit 1020 can acquire the data.

In step S520, the second feature position acquisition unit 1040 acquires body surface positions near the subject sternum and ribs in the sensor coordinate system. For example, this process is executed as follows. The user holds the ultrasonic probe so that the center of the imaging surface of the ultrasonic probe is into contact with the body surface position near the upper sternum end (at the base of the second ribs) of the subject. Next, the user operates the keyboard 160 or the like to input a command to acquire the position. Next, the measurement value acquisition unit 1030 acquires updated measurement results about the position and orientation of the ultrasonic probe in the sensor coordinate system. The information processing apparatus 100 records the center position of the imaging surface of the ultrasonic probe, as $p_{U1}$. Likewise, the information processing apparatus 100 records the body surface position near the lower sternum end, as $p_{M2}$. In addition, the information processing apparatus 100 records the body surface positions near the left and right second ribs, as "$p_{U3}$" and "$p_{U4}$," respectively. It is desirable that the positions $p_{U3}$ and $p_{U4}$ be symmetrical about the body axis of the subject. The grounds for this will be described in detail when step S533 is described below. The information processing apparatus 100 may record these four positions $p_{U1}$ to $p_{U4}$ in the order in which the user specifies the positions. Alternatively, the information processing apparatus 100 may record the positions in an arbitrary order, based on the instructions input to the keyboard 160 by the user. The information processing apparatus 100 records the positions $p_{U1}$ to $p_{U4}$ as extended vectors representing positions in the 3D space.

In the above description, the ultrasonic probe whose position and orientation are measured in the sensor coordinate is used, and the center position of the imaging surface of the ultrasonic probe is acquired, to acquire the body surface positions near the subject sternum and ribs. However, the first exemplary embodiment is not limited to such example. For example, instead of the ultrasonic probe, a device such as a stylus may be used. In this case, the leading edge of the stylus may be measured in the sensor coordinate system. More specifically, the position of the leading edge of the stylus may be acquired when the leading edge of the stylus is brought into contact with a predetermined region of the subject. In this way, in step S520, the second feature position acquisition unit 1040 acquires the body surface positions near the sternum and the ribs. Next, the operation proceeds to step S530.

In step S530, the transformation rule calculation unit 1050 calculates a transformation rule relating to the coordinate transformation between the sensor coordinate system and the MRI image coordinate system. In other words, the transformation rule calculation unit 1050 calculates the positional correspondence relationship between the subject and the 3D image, by calculating the correspondence relationship between a plurality of positions based on the sternum and ribs acquired by the first feature position acquisition unit 1020 and a plurality of positions based on the sternum and ribs acquired by the second feature position acquisition unit 1040. Step S530 will be described in detail below with reference to FIG. 6.

In step S540, the corresponding cross-sectional image generation unit 1060 generates MRI corresponding cross-sectional images corresponding to ultrasonic images sequentially input based on a predetermined frame rate, by using the position and orientation of the ultrasonic probe and the transformation rule acquired in step S530. In addition, the display image generation unit 1080 generates a display image so that a corresponding cross-sectional image and an ultrasonic image are compared and examined. More specifically, the following process is executed.

First, the corresponding cross-sectional image generation unit 1060 acquires the ultrasonic imaging region in the probe coordinate system. For example, if the ultrasonic image is rectangle, the corresponding cross-sectional image generation unit 1060 acquires positions at the four corners of the image. Next, the corresponding cross-sectional image generation unit 1060 acquires updated measurement values relating to the position and orientation of the ultrasonic probe from the measurement value acquisition unit 1030. Next, based on the values, the corresponding cross-sectional image generation unit 1060 calculates the positions at the four corners in the sensor coordinate system.

In addition, based on the transformation rule M4 calculated in step S530, the corresponding cross-sectional image generation unit 1060 transforms the positions into those in the MRI image coordinate system. In this way, the corresponding cross-sectional image generation unit 1060 calculates the positions at the four corners in the MRI image coordinate system. Next, the corresponding cross-sectional image generation unit 1060 calculates a rectangular region in the MRI image coordinate system, the region being formed by connecting the positions at the four corners. By segmenting an MRI image in the region, the corresponding cross-sectional image generation unit 1060 generates the corresponding cross-sectional image.

Next, the display image generation unit 1080 acquires an updated ultrasonic image acquired by the ultrasonic image acquisition unit 1070. Next, the display image generation unit 1080 generates a display image in which the corresponding cross-sectional image acquired by the corresponding cross-sectional image generation unit 1060 and the ultrasonic image can be compared and examined. The display image generation unit 1080 displays the display image on the monitor 140 or the like. For example, the display image generation unit 1080 may display the corresponding cross-sectional image and the ultrasonic image side by side in the display image. Alternatively, the display image generation unit 1080 may superimpose one of the images on the other image.

In this way, the user can compare and examine an ultrasonic image and an MRI cross-sectional image corresponding to the ultrasonic image. Step S540 is repeatedly executed on the ultrasonic images input momentarily, until the user inputs a predetermined command.

In step S550, the information processing apparatus 100 determines whether to end the process. If the process needs to end (YES in step S550), the operation proceeds to end. If not (NO in step S550), the operation returns to step S520. The information processing apparatus 100 makes this determination based on operations entered to the mouse 150 or the keyboard 160 by the user. Thus, by observing the ultrasonic image and the corresponding cross-sectional image displayed on the monitor 140 in step S540, the user can determine whether the coordinate transformation is appropriately executed in step S530. Namely, the user can switch the process executed by the information processing apparatus 100. For example, if the user determines that the coordinate transformation is executed appropriately (YES in step S550), the information processing apparatus 100 ends the process. If not (NO in step S550), the information processing apparatus 100 can cause the second feature position acquisition unit 1040 to acquire the body surface positions near the sternum and ribs in the sensor coordinate system again and the transformation rule calculation unit 1050 to calculate the coordinate transformation again.

Alternatively, after the user determines that the coordinate transformation has been executed appropriately, the information processing apparatus 100 may continue the process, instead of ending the process. For example, by using the MRI image and the ultrasonic image, the information processing apparatus 100 may further execute a process of correcting the coordinate transformation more accurately, including correction regarding a change of the orientation of the subject. In such case, the information processing apparatus 100 can use the transformation rule relating to the coordinate transformation calculated in step S530, as an initial value.

Figure 6:
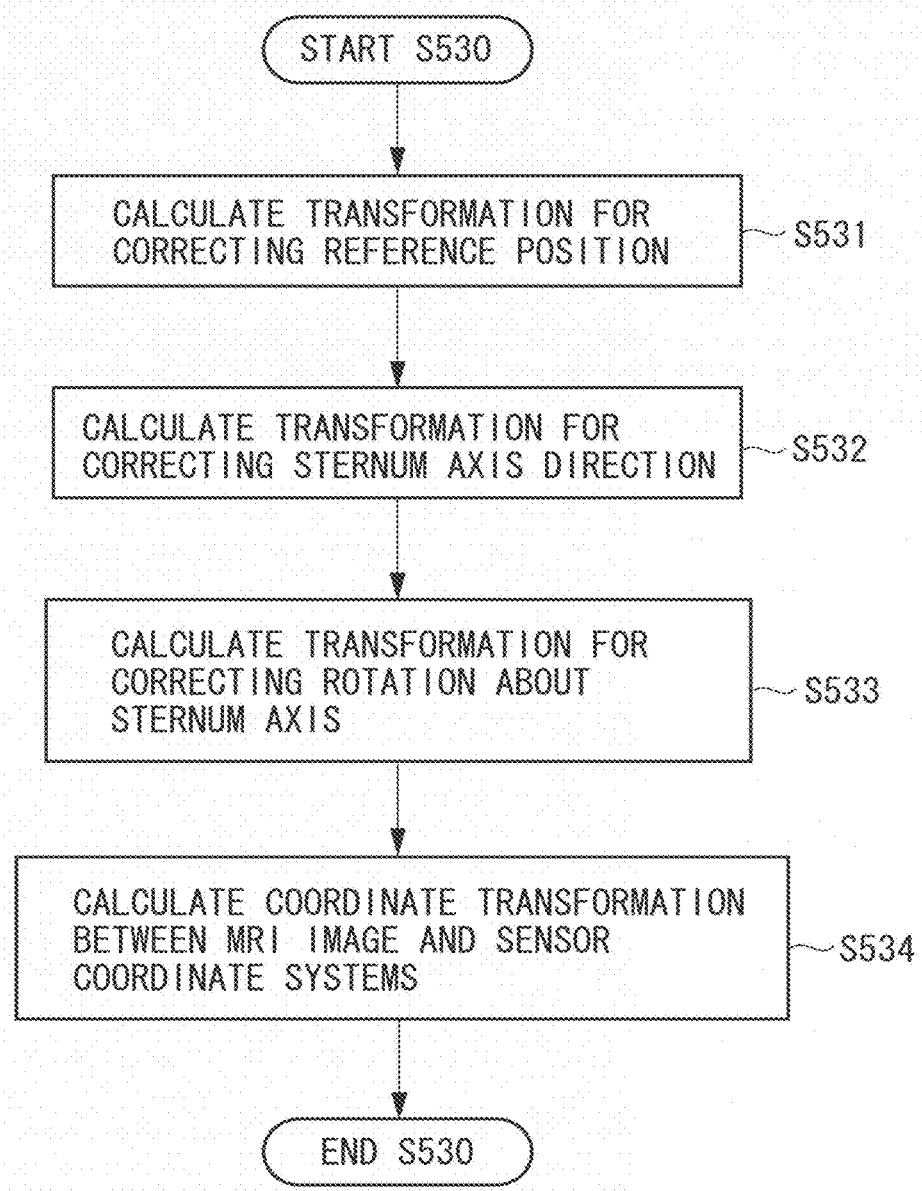
FIG. 6 is a flow chart illustrating a coordinate transformation calculation process according to the first exemplary embodiment in detail.

Next, step S530 will be described in detail with reference to the flow chart in FIG. 6. In step S531, the transformation rule calculation unit 1050 calculates the coordinate transformation to align the body surface position $p_{U1}$ near the upper sternum end (at the base of the second ribs) in the sensor coordinate system with the body surface position $p_{M1}$ near the upper sternum end in the MRI image coordinate system. Since such point near the base of the second ribs can most accurately and easily be specified from the outside of the body, the point is preferentially used for alignment. The coordinate transformation is represented by a rigid transformation matrix $M_1$. The rigid transformation matrix $M_1$ is a 4×4 matrix satisfying the relationship in mathematical expression (1).

$$p_{M1} = M_1 p_{U1} \tag{1}$$

In addition, the transformation rule calculation unit 1050 calculates positions $p_{U1}'$ to $p_{U4}'$ by using the rigid transformation matrix $M_1$ and executing rigid transformation on the body surface positions $p_{U1}$ to $p_{U4}$ near the sternum and ribs in the sensor coordinate system. In the transformation according to the first exemplary embodiment, the positions $p_{U1}$ and $p_{U1}'$ represent the same position.

In step S532, the transformation rule calculation unit 1050 calculates the coordinate transformation to align a straight line (the sternum axis) connecting the body surface positions near the upper and lower sternum ends on which coordinate transformation has been executed in step S531 with the corresponding sternum axis in the MRI coordinate system. More specifically, the transformation rule calculation unit 1050 calculates the coordinate transformation as follows. First, based on mathematical expression (2), the transformation rule calculation unit 1050 calculates a sternum direction vector $d_{U2}$, which is defined by the body surface position near the upper sternum end (at the base of the second ribs) and by the body surface position near the lower sternum end on which coordinate transformation has been executed in step S531.

$$d_{U2} = p'_{U2} - p'_{U1} \tag{2}$$

Likewise, based on mathematical expression (3), the transformation rule calculation unit 1050 calculates a sternum direction vector $d_{M2}$, which is defined by the body surface positions near the upper and lower sternum ends in the MRI image coordinate system.

$$d_{M2} = p_{M2} - p_{M1} \tag{3}$$

Next, based on mathematical expression (4), the transformation rule calculation unit 1050 calculates the cross product of the vectors, that is, a vector $d_{a2}$ representing the rotation axis direction, to align the vector $d_{U2}$ (the subject sternum direction measured by the position and orientation measurement apparatus 130) with the vector $d_{M2}$ (the subject sternum direction specified in the 3D MRI image).

$$d_{a2} = d_{U2} \times d_{M2} \tag{4}$$

Next, based on mathematical expression (5), the transformation rule calculation unit 1050 calculates an amount $\theta_2$ (rotation angle) of rotation with the direction represented by the vector $d_{a2}$ calculated based on mathematical expression (4) as the axis.

$$\theta_2 = \cos^{-1}\left(\frac{d_{U2} \cdot d_{M2}}{\|d_{U2}\|\|d_{M2}\|}\right) \tag{5}$$

Next, the transformation rule calculation unit 1050 calculates a rigid transformation matrix $M_2$ that enables rotation with the body surface position $p_{U1}'$ near the upper sternum end on which coordinate transformation has been executed in step S531 as the center and with the direction of the vector $d_{a2}$ as the axis by the rotation amount $\theta_2$. The rigid transformation matrix $M_2$ is a 4×4 matrix and can be calculated by a known method. The rigid transformation matrix $M_2$ represents the correspondence relationship between the subject and the 3D image and aligns the position based on the base of the subject second ribs acquired by the first feature position acquisition unit 1020 with the position based on the base of the second ribs in the 3D MRI image acquired by the second feature position acquisition unit 1040. Assuming that a measurement value of the position near the upper sternum end (at the base of the second ribs) is the most reliable value and a measurement value of the position near the lower sternum end is the second most reliable value, if such positions of the sternum are used, accurate alignment can be executed.

In addition, the transformation rule calculation unit 1050 uses the rigid transformation matrix $M_2$ to execute rigid transformation on the body surface positions $p_{U1}'$ to $p_{U4}'$ near the sternum and ribs on which rigid transformation has been executed in step S531, to calculate positions $p_{U1}''$ to $p_{U4}''$. In the transformation according to the first exemplary embodiment, the positions put, $p_{U1}$, $p_{U1}'$, and $p_{U1}''$ represent the same position.

In step S533, the transformation rule calculation unit 1050 calculates the coordinate transformation for correcting rotation about the sternum axis, based on the body surface positions near the sternum and ribs in the MRI image coordinate system and the body surface positions near the sternum and ribs calculated in step S532.

Figure 7:
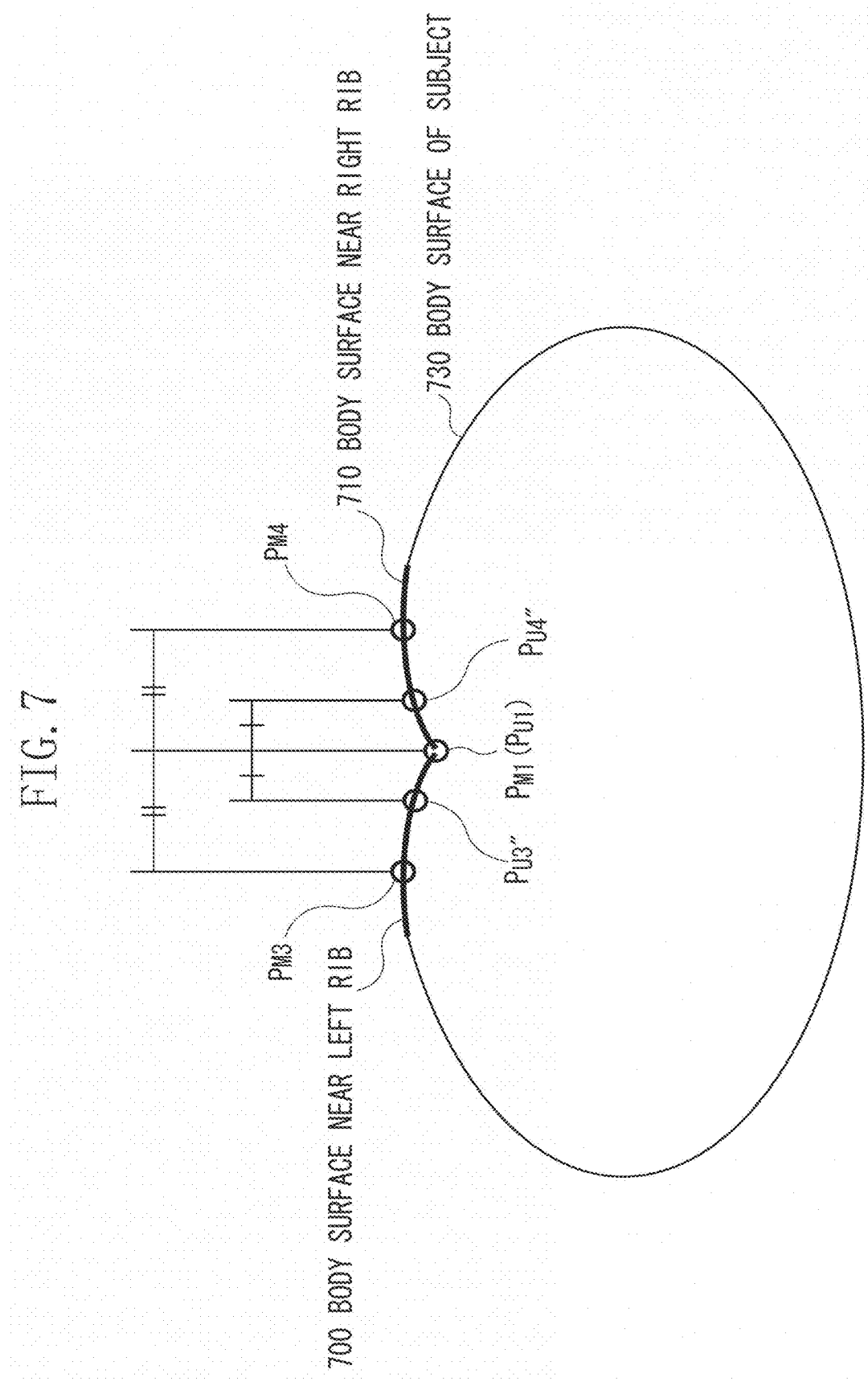
FIG. 7 is a flow chart illustrating a process of acquiring coordinates of positions based on ribs.

FIG. 7 schematically illustrates the body surface positions $p_{M1}$, $p_{M3}$, and $p_{M4}$ near the sternum and ribs acquired in step S510 and the body surface positions $p_{U1}$, $p_{U3}$, and $p_{U4}$ near the sternum and ribs acquired in step S520. While these positions of an actual subject exist in the 3D space, for convenience of description, the positions are projected on an axial cross section of the subject, as illustrated in FIG. 7. In addition, while the positions $p_{U1}$, $p_{U3}$, and $p_{U4}$ and the positions $p_{M1}$, $p_{M3}$, and $p_{M4}$ are positions represented in different coordinate systems, FIG. 7 illustrates the individual positions on the subject. In FIG. 7, on the entire body surface 730 of the subject, body surfaces 700 and 710 near the left and right ribs, respectively, are regions near the ribs. As illustrated in FIG. 7, the subject body surfaces 700 and 710 near the right and left ribs of the subject can be deemed as curves substantially symmetrical about the body axis of the subject in the 3D space.

The position $p_{M3}$ acquired in step S510 exists on the curved body surface 700 near the second left rib and the position $p_{M4}$ acquired in step S510 exists on the curved body surface 710 near the second right rib. Likewise, the position $p_{U3}$ acquired in step S520 exists on the curved body surface 700 near the second left rib and the position $p_{U4}$ acquired in step S520 exists on the curved body surface 710 near the second right rib. However, as illustrated in FIG. 7, the positions $p_{M3}$ and $p_{U3}$ ($p_{M4}$ and $p_{U4}$) do not necessarily represent the same region of the subject. Thus, if the acquired $p_{M3}$, $p_{M4}$, $p_{U3}$, and $p_{U4}$ have complete freedom on the body surfaces near the second left and right ribs, it is not easy to use these points and calculate the coordinate transformation for correcting rotation about the sternum axis. Therefore, in the first exemplary embodiment, in steps S510 and S520, the user acquires body surface positions near the right and left ribs, the positions being approximately symmetrical about the body axis of the subject. In this way, the transformation rule calculation unit 1050 can use a simple process to calculate the coordinate transformation.

Next, step S533 executed by the transformation rule calculation unit 1050 will be described in detail. First, the transformation rule calculation unit 1050 calculates a normal line $n_U$, with respect to a plane including the body surface positions near the upper and lower sternum ends and the body surface position near the left second rib calculated in step S532. The transformation rule calculation unit 1050 calculates the normal line $n_{UL}$, based on mathematical expression (6).

$$n_{UL} = (p_{U2}'' - p_{U1}'') \times (p_{U3}'' - p_{U1}'') \quad (6)$$

Likewise, based on mathematical expression (7), the transformation rule calculation unit 1050 calculates a normal line $n_{UR}$ with respect to a plane including the body surface positions near the upper and lower sternum ends and the body surface position near the right second rib.

$$n_{UR} = (p_{U4}'' - p_{U1}'') \times (p_{U2}'' - p_{U1}'') \quad (7)$$

Next, based on mathematical expression (8), the transformation rule calculation unit 1050 calculates a mean vector $n_U$ of the normal lines $n_{UL}$ and $n_{UR}$.

$$n_U = \frac{n_{UL} + n_{UR}}{2} \quad (8)$$

In addition, based on the body surface positions near the sternum and ribs in the MRI image coordinate system, the transformation rule calculation unit 1050 calculates normal lines $n_{ML}$ and $n_{MR}$ and a mean vector $n_M$ thereof, by using mathematical expressions (9), (10), and (11).

$$n_{ML} = (p_{M2} - p_{M1}) \times (p_{M3} - p_{M1}) \quad (9)$$

$$n_{MR} = (p_{M4} - p_{M1}) \times (p_{M2} - p_{M1}) \quad (10)$$

$$n_M = \frac{n_{ML} + n_{MR}}{2} \quad (11)$$

Next, based on mathematical expressions (12) and (13), the transformation rule calculation unit 1050 calculates a rotation axis $d_{a3}$ and a rotation amount $\theta_3$ for aligning the directions of the vectors $n_U$ and $n_M$.

$$d_{a3} = n_U \times n_M \quad (12)$$

$$\theta_3 = \cos^{-1}\left(\frac{n_U \cdot n_M}{\|n_U\| \|n_M\|}\right) \quad (13)$$

Next, the transformation rule calculation unit 1050 calculates a rigid transformation matrix $M_3$ that enables rotation with the body surface position $p_{U1}''$ near the upper sternum end obtained by the coordinate transformation in step S532 as the center and the direction of the vector $d_{a3}$ as the axis by the rotation amount $\theta_3$. The rigid transformation matrix $M_3$ represents the rotation direction correspondence relationship between the subject and the 3D MRI image with the sternum as the axis, based on the positional correspondence relationship based on the ribs acquired by the first and second feature position acquisition units 1020 and 1040. The rigid transformation matrix $M_3$ is a 4×4 matrix and can be calculated by a known method.

In step S534, the transformation rule calculation unit 1050 calculates the rigid transformation matrix $M_4$, by combining the rigid transformation matrixes $M_1$ to $M_3$. This rigid transformation matrix $M_4$ transforms positional coordinates in the sensor coordinate system into corresponding positional coordinates in the MRI image coordinate system. The calculation is executed by using mathematical expression (14).

$$M_4 = M_3 M_2 M_1 \quad (14)$$

Through the above steps S531 to S534, the transformation rule calculation unit 1050 calculates the rigid transformation $M_4$ for transforming positional coordinates in the sensor coordinate system into corresponding positional coordinates in the MRI image coordinate system. In this way, the information processing apparatus 100 executes the process.

In step S530, the information processing apparatus 100 may further execute the following process. Namely, the monitor 140 may display the positions, which are obtained by executing the rigid transformation based on the rigid transformation matrix $M_4$ on the body surface positions near the sternum and ribs in the sensor coordinate system acquired in step S520, so that the inspector can recognize the 3D positional relationship. In the same way, the monitor 140 may display the body surface positions near subject sternum and ribs in the MRI image coordinate system acquired in step S510. In this way, the information processing apparatus 100 can present the positional relationship among the body surface positions near the sternum and ribs to the user. As a result, the user can recognize whether steps S531 to S534 have been executed appropriately.

Figure 8:
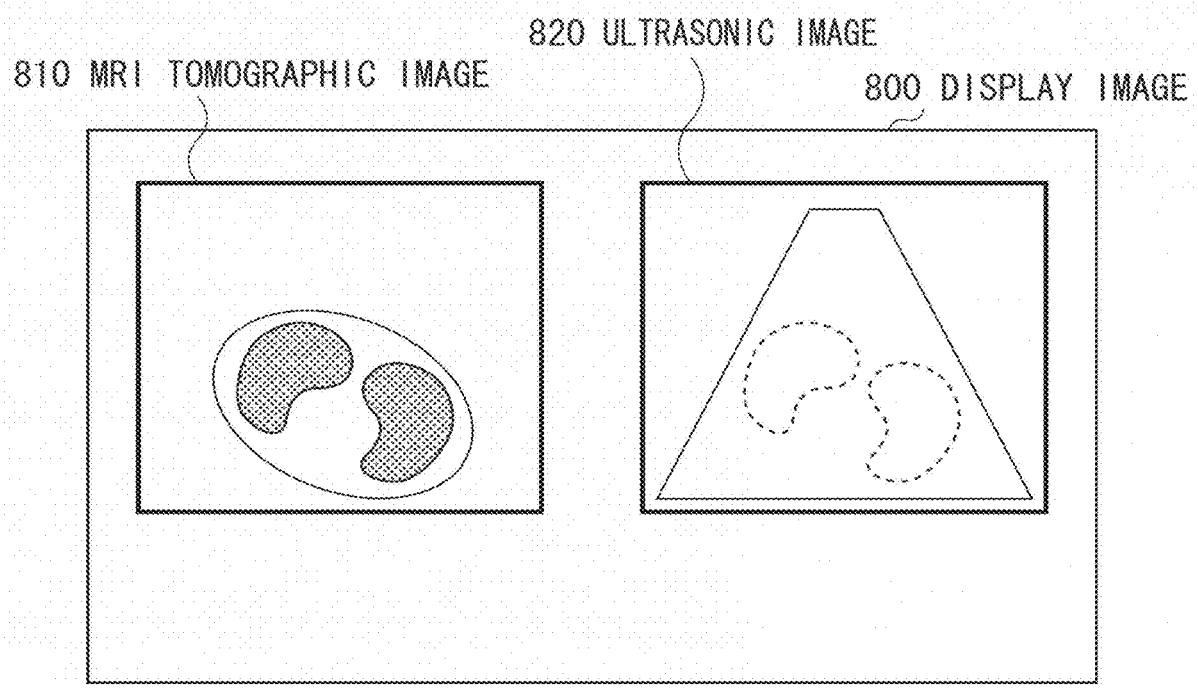
FIG. 8 is a view illustrating an image displayed by a display control unit on a monitor (display unit).

FIG. 8 illustrates a display image 800 displayed by the display unit 1400 in step S540 in response to instructions from the display control unit 1090. In the display image 800, an MRI tomographic image 810 and an ultrasonic image 820 are displayed side by side. The display image 800 is displayed by the display unit 1400 while the ultrasonic image 820 is being captured. Based on the correspondence relationship between the subject and the 3D image calculated by the transformation rule calculation unit 1050, the MRI tomographic image 810 corresponding to the captured ultrasonic image 820 is generated.

Thus, based on the diagnostic imaging system 1 according to the first exemplary embodiment, a transformation rule between the sensor coordinate system and the MRI image coordinate system can be calculated accurately without requiring complicated operations.

(Variation 1-1)

In the above example, to acquire the correspondence relationship between the 3D image and the subject, the inspector needs to specify body surface positions of the subject manually. The information processing apparatus 100 may have a function of presenting user assistance information for measurement, to reduce the burden on the inspector.

Figure 9:
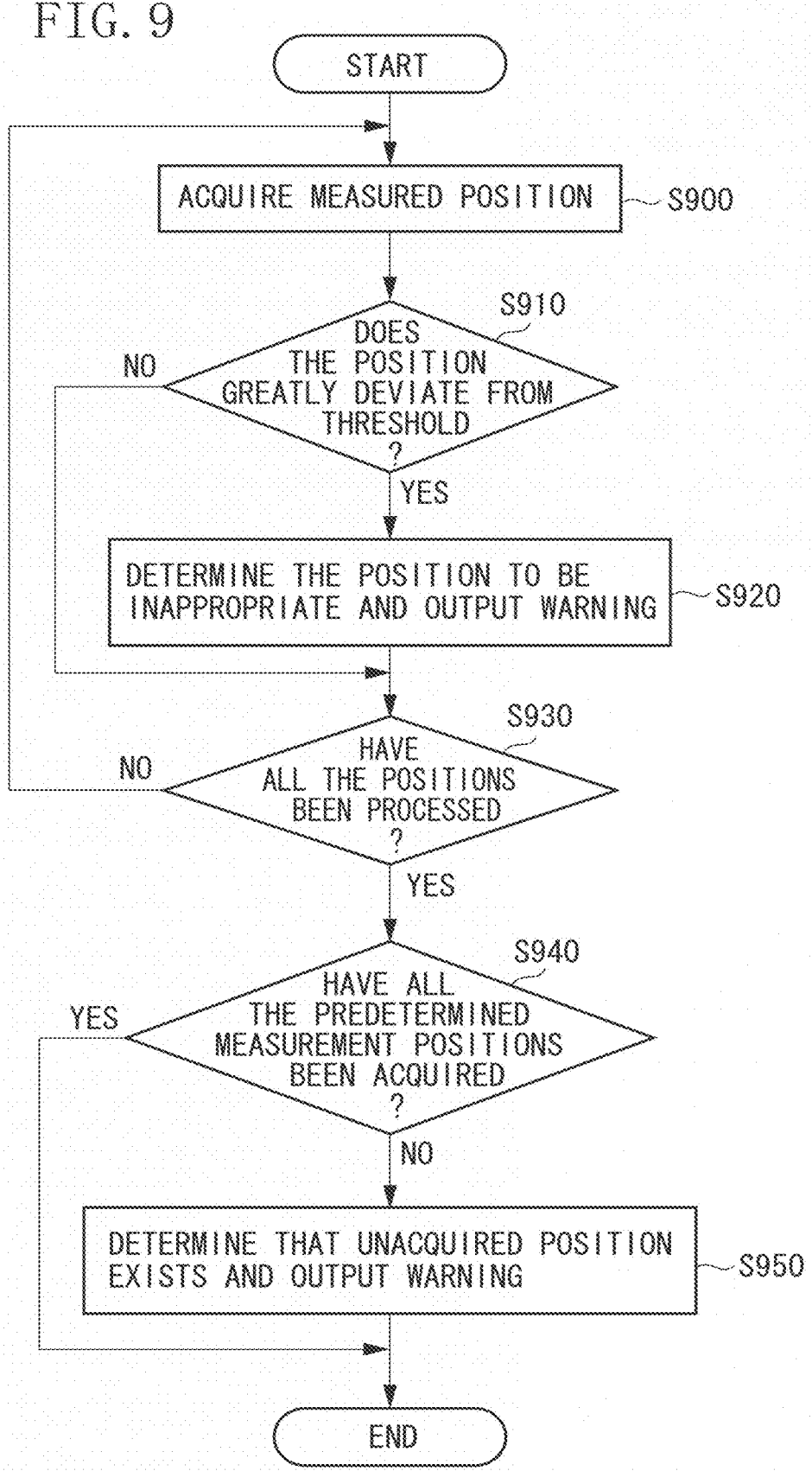
FIG. 9 is a flowchart illustrating a process executed by a determination unit that determines success or failure of a coordinate position acquisition process executed by a first or second feature position acquisition unit.

A process of assisting work by the inspector will be described with reference to the flow chart in FIG. 9. This process is executed each time the second feature position acquisition unit 1040 acquires a measurement position of the subject in the above step S520 in FIG. 5.

First, in step S900, the determination unit 1100 acquires a feature position acquired by the second feature position acquisition unit 1040. Next, in step S910, the determination unit 1100 determines whether the acquired position greatly deviates from a threshold. In one example, the determination unit 1100 determines whether a predetermined position is acquired. In the above example, the predetermined positions are two points based on the sternum (one point near the base of the second ribs and the other point near the lower sternum) and two points based on the ribs symmetrical about the sternum. The determination unit 1100 determines whether the acquired feature position matches any one of the predetermined positions.

In another example, the determination unit 1100 determines whether a plurality of sternum positions acquired by the second feature position acquisition unit 1040 are distributed in a range exceeding the sternum size of a normal subject. If so, the determination unit 1100 determines the measurement as a failure. In another example where the inspector measures a subject lying on a bed, it is possible to deem that a direction of the sternum is approximately parallel to a direction of the bed or that at least the angle formed by the directions of the bed and the sternum falls within a predetermined angle range. Thus, in this example, if the sternum position acquired by a plurality of positions based on the sternum forms a predetermined angle with respect to the horizontal direction of the bed, the determination unit 1100 determines the measurement as a failure.

In another example where positions of three or more sternum points have already been specified, if the determination unit 1100 determines that one point greatly deviates from a predetermined threshold as compared with the other points, the determination unit 1100 determines the measurement as a failure. If the determination unit 1100 determines the measurement as a failure (YES in step S910), the operation proceeds to step S920. If not (NO in step S910), the operation skips step S920 and proceeds to step S930. In step S920, the output unit 1110 causes the display unit 1400 to display a warning indicating that the acquired position is inappropriate.

In step S930, the determination unit 1100 determines whether all the acquired positions have been processed. If unprocessed points still exist (NO in step S930), the operation returns to step S900. If all the input points have been processed (YES in step S930), the operation proceeds to step S940.

In step S940, the determination unit 1100 determines whether all the predetermined feature positions have been acquired. In the above example, the predetermined feature positions are two points based on the sternum (one point near the base of the second ribs and the other point near the lower sternum end) and two points based on the ribs symmetrical about the sternum. If all the predetermined feature positions have been acquired (YES in step S940), the operation skips step S950 and ends the process. If not (NO in step S940), the operation proceeds to step S950. In step S950, the output unit 1110 outputs warning information about an unacquired feature position and the display unit 1400 displays the information.

The above process may be executed on not only the acquisition process executed by the second feature position acquisition unit 1040 but also on the acquisition process executed by the first feature position acquisition unit 1020. In this way, the inspector can specify the feature positions in the 3D image more easily.

The information processing apparatus 100 may present assistance information to the user in another way. For example, the information processing apparatus 100 may present assistance information to assist the user to acquire the positions $p_{U3}$ and $p_{U4}$ symmetrical about the body axis of the subject. For example, based on information about the acquired positions $p_{U1}$ to $p_{U4}$, the distance from a straight line connecting the positions $p_{U1}$ and $p_{U2}$ to the position $p_{U3}$ and the distance from the straight line to the position $p_{U4}$ are calculated. If the difference between these distances is equal to or greater than a predetermined value, the display unit 1400 may present a message or the like requesting the inspector to acquire the positions again.

Alternatively, if the second feature position acquisition unit 1040 acquires the position $p_{U4}$ after acquiring the positions $p_{U1}$ to $p_{U3}$, the distance from the straight line connecting the positions $p_{U1}$ and $p_{U2}$ to the position $p_{U3}$ and the distance from the straight line connecting the positions $p_{U1}$ and $p_{U2}$ to the current position, which is the center of the imaging surface of the ultrasonic probe may be calculated. In this way, the display unit 1400 may present information about the difference between the distances. For example, if the difference between the distances is equal to or less than a predetermined value, the display unit 1400 may output beep sound. If the intervals of generation of the beep sound is controlled based on the difference between the distances, the beep sound can be generated at shorter intervals for a smaller difference.

Alternatively, the display unit 1400 may display information on the monitor 140, such as an image that enables the user to three-dimensionally grasp the positional relationship among the acquired positions $p_{U1}$ to $p_{U4}$. Based on the above process, since the determination unit 1100 assists the user to acquire the positions $p_{U3}$ and $p_{U4}$ symmetrical about the body axis of the subject, the user can acquire suitable information after step S530.

In another example, when executing a measurement process, the second feature position acquisition unit 1040 presents assistance information to the user. For example, the display unit 1400 may cause the monitor 140 to display a schematic image diagram of the human body breast region in which positions of the sternum and ribs are marked. In this case, positions in the schematic diagram may be marked differently, depending on the acquisition status of the body surface positions near the sternum and ribs. For example, if the positions are acquired in a predetermined order, based on the current acquisition status, the position to be acquired next may be marked differently.

If the positions are acquired in an arbitrary order, different marks may be displayed to distinguish acquired and unacquired positions. Based on the above process, the user can be requested to acquire the body surface positions near the sternum and ribs.

(Variation 1-2)

In the first exemplary embodiment, in step S520, the user specifies one right position and one left position on the body surface near the ribs of the subject, and the second feature position acquisition unit 1040 acquires the positions. However, the first exemplary embodiment is not limited to such example. For example, the user may specify a plurality of positions for the right or left side on the body surface near the ribs, and the second feature position acquisition unit 1040 may acquire the positions. For example, as the positions on the body surface near the left side ribs of the subject, the user may specify a plurality of positions $p_{U3i}$ ($1 \leq i \leq N$, wherein N is the number of the positions), and the second feature position acquisition unit 1040 acquires the positions.

In this case, the second feature position acquisition unit 1040 is configured to be capable of selecting a position suitable for calculating coordinate transformation, from among the plurality of positions $p_{U3i}$ ($1 \leq i \leq N$). For example, the second feature position acquisition unit 1040 calculates the distance $d_{U14}$ between the body surface position $p_{U1}$ near the upper sternum end and the body surface position $p_{U4}$ near the right rib. In addition, the second feature position acquisition unit 1040 calculates the distance between each of the plurality of positions $p_{U3i}$ on the body surface near the left rib and the body surface position $p_{U1}$ near the upper sternum end, as the distance $d_{U13i}$ (1≤i≤N). Next, among the distances $d_{U13i}$ (1≤i≤N), the second feature position acquisition unit 1040 selects one closest to the distance $d_{U14}$ and determines the corresponding position to be the position $p_{U3}$. Based on the above method, when acquiring the body surface positions near the subject ribs in the sensor coordinate system, the user does not need to execute a complicated process of selecting positions symmetrical about the body axis of the subject. Thus, the positions can be acquires by a simpler operation.

(Variation 1-3)

In steps S510 and S520 in the first exemplary embodiment, the first and second feature position acquisition units 1020 and 1040 acquire the body surface positions near the upper and lower sternum ends of the subject. However, the first exemplary embodiment is not limited to such example. For example, as long as the MRI image coordinate system and the sensor coordinate system can be associated, the first and second feature position acquisition units 1020 and 1040 may acquire other body surface positions. In addition, the body surface position near the lower sternum end is not necessarily aligned between the MRI image coordinate system and the sensor coordinate system.

(Variation 1-4)

In step S533 in the first exemplary embodiment, the transformation rule calculation unit 1050 uses mathematical expression (8) to calculate the mean vector $n_U$ of the normal line $n_{UL}$ with respect to the plane including the body surface position near the left second rib and the normal line $n_{UR}$ with respect to the plane including the body surface position near the right second rib. Likewise, the transformation rule calculation unit 1050 uses mathematical expression (11) to calculate the mean vector $n_M$ of the normal lines $n_{ML}$ and $n_{MR}$. However, embodiments of the present invention are not limited to such example. The transformation rule calculation unit 1050 may calculate a normal line with respect to a plane including both the body surface positions near the left and right second ribs. Namely, instead of using mathematical expressions (6) to (8), the transformation rule calculation unit 1050 may use mathematical expression (15) to calculate the vector $n_U$. Likewise, instead of using mathematical expressions (9) to (11), the transformation rule calculation unit 1050 may use mathematical expression (16) to calculate the vector $n_M$.

$$n_U = (p_{U2}'' - p_{U1}'') \times (p_{U3}'' - p_{U4}'') \quad (15)$$

$$n_M = (p_{M2} - p_{M1}) \times (p_{M3} - p_{M4}) \quad (16)$$

Based on the above method, the transformation rule calculation unit 1050 can calculate the coordinate transformation for correcting rotation about the sternum axis more easily.

(Variation 1-5)

In the first exemplary embodiment, the transformation rule calculation unit 1050 uses the body surface positions near the sternum and ribs of the subject, to calculate the coordinate transformation between the sensor coordinate system and the MRI image coordinate system. However, the first exemplary embodiment is not limited to such example. For example, the transformation rule calculation unit 1050 may use the positions of the sternum and ribs of the subject, to calculate the coordinate transformation between the sensor coordinate system and the MRI image coordinate system.

In this case, in step S510, the first feature position acquisition unit 1020 acquires the positions of the sternum and ribs of the subject in the MRI image, for example, based on an operation input to the mouse 150 or the keyboard 160 by the user. In step S520, the second feature position acquisition unit 1040 causes the monitor 140 to display an ultrasonic image acquired by the ultrasonic image acquisition unit 1070 and acquires the positions of the sternum and ribs in the ultrasonic image, for example, based on an operation input to the mouse 150 by the user. In addition, the second feature position acquisition unit 1040 calculates the positions of the sternum and ribs in the sensor coordinate system, based on the measurement values of the ultrasonic probe position and orientation acquired by the measurement value acquisition unit 1030 and based on the positions specified in the ultrasonic image. Based on the above method, as compared with use of the body surface positions in the first exemplary embodiment, the transformation rule calculation unit 1050 can directly use the positions of the sternum and ribs less susceptible to positional fluctuation by the imaging environment or the like. Thus, the transformation rule calculation unit 1050 can calculate a more accurate transformation rule.

In addition, the positions of the sternum and ribs in the sensor coordinate system may be acquired in another way. For example, after executing step S520 in the first exemplary embodiment, the second feature position acquisition unit 1040 may acquire a position away from the ultrasonic probe imaging surface by a predetermined distance in the direction in which the ultrasonic beam is emitted, as the positions of the sternum and ribs. For example, a statistically average distance between a body surface and the sternum (or a rib) can be used as the predetermined distance. Alternatively, for example, the predetermined distance may be determined based on the age, gender, weight, other clinical information, or the like of the subject.

Alternatively, the positions of the sternum and a rib in the MRI image and the body surface positions near the sternum and a rib may be acquired. In this case, the distance between the sternum in the MRI image and the body surface near the sternum and the distance between the rib and the body surface near the rib can be calculated. Each of the distances can be used as the predetermined distance. In this case, the distance may be changed in view of, for example, the difference in the orientation of the subject between when the MRI image is captured and when the ultrasonic image is captured.

Based on the above method, the user does not need to specify the positions of the bones in the ultrasonic image. Thus, the user can execute the process more easily. In another aspect, characteristic sternum positions may be specified in the 3D MRI image, and easily-specified body surface positions may be specified by the ultrasonic probe whose position and orientation are measured by the position and orientation measurement apparatus 130. In this way, the inspector can execute the alignment more easily.

In the first exemplary embodiment, each of the first and second feature position acquisition units 1020 and 1040 acquires the body surface positions near the sternum and ribs of the subject as a group of four points. However, embodiments of the present invention are not limited to such exemplary embodiment. In a second exemplary embodiment, a plurality of points (a point group) are acquired as the body surface positions near the ribs.

Since a diagnostic imaging system according to the second exemplary embodiment of the present invention has the same configuration as that of the first exemplary embodiment, description thereof will not be repeated. However, the second exemplary embodiment differs from the first exemplary embodiment in that the program stored in the main memory 212 realizes the processes illustrated in FIGS. 10 and 11.

Figure 10:
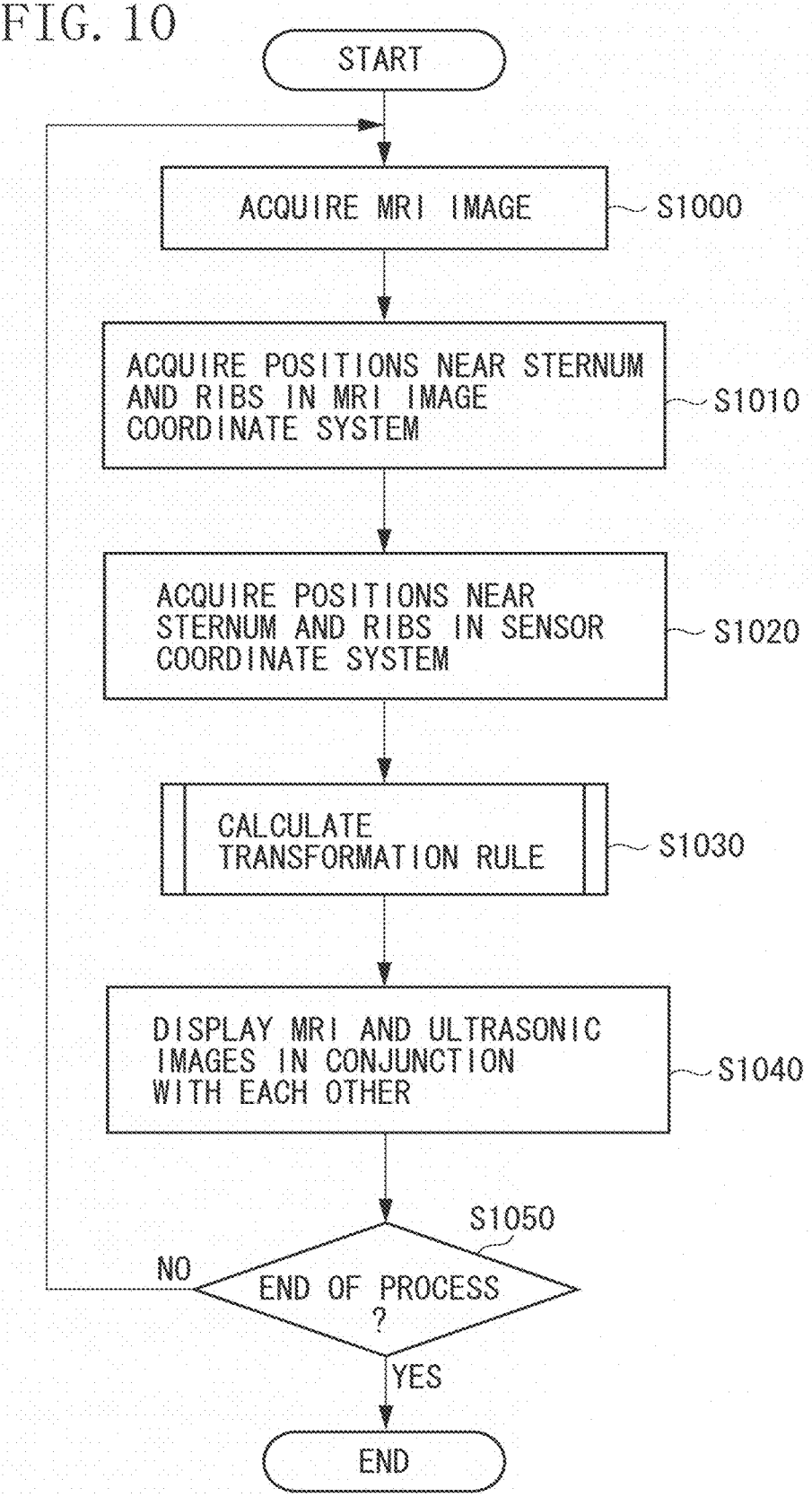
FIG. 10 is a flow chart illustrating a process executed by a diagnostic imaging system according to a second exemplary embodiment of the present invention.

Next, an overall process executed by the diagnostic imaging system 1 according to the second exemplary embodiment will be described in detail with reference to the flow chart in FIG. 10. Since step S1000 is similar to step S500 according to the first exemplary embodiment, description thereof will not be repeated.

In step S1010, the first feature position acquisition unit 1020 acquires the body surface positions near the sternum and ribs of the subject rendered in the MRI image, as positions in the MRI image coordinate system. Since acquisition of the body surface positions near the sternum is similar to that according to the first exemplary embodiment, detailed description thereof will not be repeated. The first feature position acquisition unit 1020 records the body surface positions near the upper and lower sternum ends in the MRI image coordinate system as the positions $p_{M1}$ and $p_{M2}$, respectively.

Next, acquisition of the body surface positions near the ribs will be described. While the body surface positions near the left and right second ribs of the subject are acquired as in the first exemplary embodiment, the second exemplary embodiment differs from the first exemplary embodiment in that the first feature position acquisition unit 1020 acquires the positions as a plurality of points (a point group). The first feature position acquisition unit 1020 acquires the body surface positions near the ribs as a point group as follows.

First, as in the first exemplary embodiment, the information processing apparatus 100 causes the monitor 140 to display an arbitrary segmented cross-sectional image (cross-sectional image), such as an axial image, a sagittal image, or a coronal image of an MRI image. The user operates the mouse 150, the keyboard 160, or the like to switch the position or orientation of the cross-sectional image. Next, for example, by using the mouse 150, the user specifies the body surface positions near the sternum and ribs displayed in the cross-sectional image, and the first feature position acquisition unit 1020 acquires the positions. Based on the position and orientation of the cross section and the positions specified by the user in the cross-sectional image, the first feature position acquisition unit 1020 calculates the body surface positions near the sternum and ribs in the MRI image coordinate system.

However, unlike the first exemplary embodiment, the user can specify a plurality of positions, by using the mouse 150 or the like. In this way, the first feature position acquisition unit 1020 records a group of points on the body surface positions near the left second rib as $p_{M3i}$ ($1 \leq i \leq N_{ML}$) and a group of points on the body surface positions near the right second ribs as $p_{M4j}$ ($1 \leq j \leq N_{MR}$), wherein $N_{ML}$ represents the number of points on the body surface positions near the left second rib and $N_{MR}$ represents the number of points on the body surface positions near the right second rib.

In step S1020, the second feature position acquisition unit 1040 acquires the body surface positions near the sternum and ribs of the subject in the sensor coordinate system. Since acquisition of the body surface positions near the sternums is similar to that according to the first exemplary embodiment, detailed description thereof will not be repeated. The second feature position acquisition unit 1040 records the body surface positions near the upper and lower sternum ends in the sensor coordinate system as $p_{U1}$ and $p_{U2}$, respectively.

Next, acquisition of the body surface positions near the ribs will be described. As in the first exemplary embodiment, the second feature position acquisition unit 1040 acquires the body surface positions near the left and right second ribs of the subject. However, the second exemplary embodiment differs from the first exemplary embodiment in that the second feature position acquisition unit 1040 acquires the positions as a plurality of points (a point group). The second feature position acquisition unit 1040 acquires the body surface positions near the ribs as a point group as follows.

First, the user holds the ultrasonic probe so that the center of the imaging surface of the ultrasonic probe is into contact with a body surface position near the left second rib of the subject on the side of the body axis. Next, the user operates the keyboard 160 or the like, to input a command to start acquisition of the positions. Next, the user moves the ultrasonic probe toward the side of the subject along the body surface position near the left second rib of the subject. Next, when the ultrasonic probe reaches the position near the end of the left second rib of the subject, the user operates the keyboard 160 or the like to input a command to end acquisition of the positions.

After acquiring the command to start the acquisition from the user, the second feature position acquisition unit 1040 sequentially acquires updated measurement results of the position and orientation of the ultrasonic probe in the sensor coordinate system from the measurement value acquisition unit 1030 and records the updated measurement results repeatedly. The second feature position acquisition unit 1040 continuously executes the process until the second feature position acquisition unit 1040 acquires the command to end the acquisition from the user.

In this way, the second feature position acquisition unit 1040 acquires a point group on the body surface positions near the left second rib of the subject. The second feature position acquisition unit 1040 records the acquired point group on the body surface near the left second rib as $p_{U3k}$ ($1 \leq k \leq N_{UL}$), wherein $N_{UL}$ represents the number of points on the body surface near the left second rib. Likewise, the second feature position acquisition unit 1040 acquires a point group on the body surface near the right second rib and records the points as positions $p_{U4l}$ ($1 \leq l \leq N_{UR}$), wherein $N_{UR}$ represents the number of points on the body surface near the right second rib.

In step S1030, the transformation rule calculation unit 1050 calculates a transformation rule relating to the coordinate transformation between the sensor coordinate system and the MRI image coordinate system. Step S1030 will be described in detail below with reference to FIG. 11. Since steps S1040 and S1050 are similar to steps S540 and S550 according to the first exemplary embodiment, description thereof will not be repeated.

Figure 11:
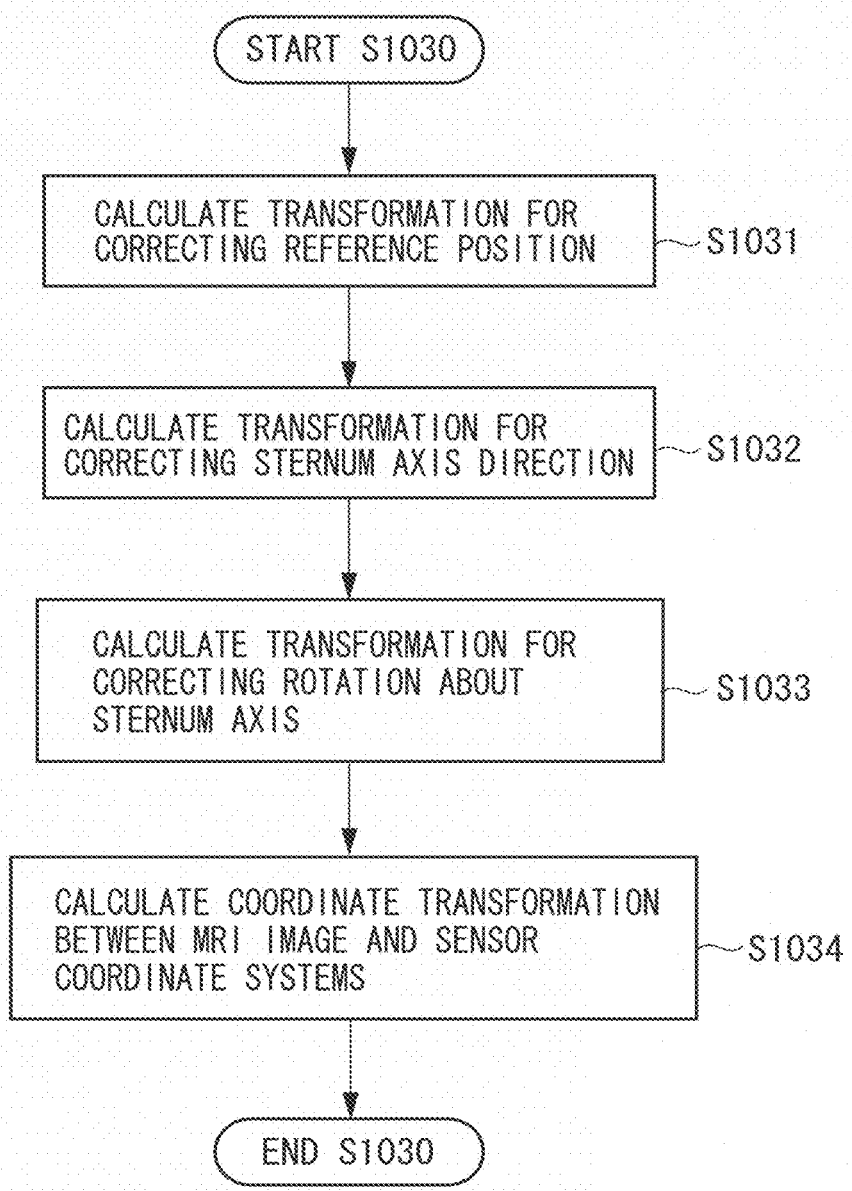
FIG. 11 is a flow chart illustrating a coordinate transformation calculation process according to the second exemplary embodiment in detail.

Step S1030 will be described in detail with reference to the flow chart in FIG. 11. In step S1031, the transformation rule calculation unit 1050 calculates the rigid transformation matrix $M_1$ in the same way as in step S531 according to the first exemplary embodiment. The transformation rule calculation unit 1050 executes rigid transformation on the body surface positions near the sternum and ribs acquired in step S1020, to calculate positions $p_{U1}'$, $p_{U2}'$, $p_{U3k}'$ ($1 \leq k \leq N_{UL}$), and $p_{U4l}'$ ($1 \leq l \leq N_{UR}$).

In step S1032, the transformation rule calculation unit 1050 calculates the rigid transformation matrix $M_2$ in the same way as in step S531 according to the first exemplary embodiment. The transformation rule calculation unit 1050 executes rigid transformation on the body surface positions near the sternum and ribs acquired in step S1031, to calculate positions $p_{U1}''$, $p_{U2}''$, $p_{U3k}''$ ($1 \leq k \leq N_{UL}$) and $p_{U4l}''$ ($1 \leq l \leq N_{UR}$).

In step S1033, based on the body surface positions near the sternum and ribs in the MRI image coordinate system and the body surface positions near the sternum and ribs calculated in step S1020, the transformation rule calculation unit 1050 calculates the coordinate transformation for correcting rotation about the sternum axis. This coordinate transformation enables rotation with a straight line connecting the positions $p_{U1}"$ and $p_{U2}"$ as the axis, approximately aligning the position $p_{M3k}"$ ($1 \leq k \leq N_{UL}$) with the position $p_{M3i}$ ($1 \leq i \leq N_{ML}$) and the position $p_{U41}"$ ($1 \leq l \leq N_{UR}$) with the position $p_{M4j}$ ($1 \leq j \leq N_{MR}$). More specifically, the transformation rule calculation unit 1050 uses an iterative closest point (ICP) method, to calculate an amount of rotation with the rotation axis uniquely determined by the poisons $p_{U1}"$ and $p_{U2}"$. Instead of the ICP method, an arbitrary optimization method, such as the steepest descent method or the Newton method, may be used to calculate the rotation amount.

In this way, the transformation rule calculation unit 1050 calculates the coordinate transformation that approximately aligns the position $p_{U3k}"$ ($1 \leq k \leq N_{UL}$) with the position $p_{M3i}$ ($1 \leq i \leq N_{ML}$) and the position $p_{U41}"$ ($1 \leq l \leq N_{UR}$) with the position $p_{M4j}$ ($1 \leq j \leq N_{MR}$), as the rigid transformation matrix $M_3$.

Since step S1034 is similar to step S534 in the first exemplary embodiment, descriptions thereof will not be repeated.

Through steps S1031 to S1034 described above, the transformation rule calculation unit 1050 calculates the rigid transformation matrix $M_4$ for transforming the position coordinates in the sensor coordinate system into corresponding position coordinates in the MRI image coordinate system.

Thus, the diagnostic imaging system 1 according to the second exemplary embodiment can acquire the body surface positions near the ribs as a plurality of points (a point group) and calculate rotation about the sternum axis. As a result, as compared with the diagnostic imaging system 1 according to the first exemplary embodiment, the transformation rule calculation unit 1050 can calculate a more accurate coordinate transformation. In addition, the user does not need to input the body surface positions near the ribs that are symmetrical about the body axis of the subject, the user can use the present diagnostic imaging system 1 more easily.

(Variation 2-1)

In the second exemplary embodiment, the user acquires the body surface positions near the ribs as a point group in each of the MRI image coordinate system and the sensor coordinate system. However, the second exemplary embodiment is not limited to such example. For example, as in the first exemplary embodiment, in step S1020, the second feature position acquisition unit 1040 may acquire the body surface positions near the ribs in the sensor coordinate system, as the positions $p_{U3}$ and $p_{U4}$ near the right and left second ribs, respectively. In this case, in step S1034, the transformation rule calculation unit 1050 can calculate an amount of rotation around the rotational axis uniquely determined by the positions $p_{U1}"$ and $p_{U2}"$ in which the position $p_{U3}"$ is approximately aligned with $p_{M3i}$ ($1 \leq i \leq N_{ML}$) and the position $p_{U4}"$ is approximately aligned with the position $p_{M4j}$ ($1 \leq j \leq N_{MR}$). For example, the transformation rule calculation unit 1050 can calculate the rotation amount based on a publicly known method such as the ICP method. In this way, the transformation rule calculation unit 1050 can acquire the body surface positions near the ribs in the sensor coordinate system easily as in the first exemplary embodiment and can calculate the coordinate transformation with high accuracy comparable to that in the second exemplary embodiment.

In addition, the second exemplary embodiment is not limited to such example. For example, in step S1010, the first feature position acquisition unit 1020 may acquire the positions near the ribs in the MRI image coordinate system, as two positions near the second right and left ribs, respectively. In this way, the same meritorious effects as those described above can be provided.

In addition, when calculating the rotation amount, the transformation rule calculation unit 1050 may treat information about the body surface positions near the left and right ribs with the same weight. Alternatively, each of the positions may be treated with a different weight. For example, the difference in the weight may be determined based on the distance between the positions $p_{U3}$ and $p_{U1}$ and the distance between the positions $p_{U4}$ and $p_{U1}$. In this case, if the distance between the positions $p_{U3}$ and $p_{U1}$ is greater than the distance between the positions $p_{U4}$ and $p_{U1}$, when calculating the rotation amount, the transformation rule calculation unit 1050 may allocate a greater weight to the information about the position near the left rib. If not, the transformation rule calculation unit 1050 may allocate a greater weight to the information about the position near the right rib. In this way, the transformation rule calculation unit 1050 can examine errors of the acquisition of the body surface positions near the sternum and ribs. Thus, since the transformation rule calculation unit 1050 can execute the process with more reliable information, the transformation rule calculation unit 1050 can calculate the rotation amount more appropriately.

(Variation 2-2)

Each of the first and second feature position acquisition units 1020 and 1040 may be configured to switch the position acquisition process. Namely, the body surface positions near the ribs may be acquired as two points near the left and right ribs, respectively, or as a point group. If both of the first and second feature position acquisition units 1020 and 1040 acquire one point near the left rib and one point near the right rib as the body surface positions, the information processing apparatus 100 executes steps S530 to S550 according to the first exemplary embodiment. If both of the first and second feature position acquisition units 1020 and 1040 acquire the body surface positions near the ribs as point groups, the information processing apparatus 100 executes steps S1030 to S1050 according to the second exemplary embodiment.

In addition, if one of the first and second feature position acquisition units 1020 and 1040 acquires one body surface position near the left rib and one body surface position near the right rib and the other feature position acquisition unit acquires the body surface positions as point groups, the information processing apparatus 100 executes the process described in variation 2-1.

In this way, the user can choose a desirable process method, in view of both time and effort required to input the body surface positions near the ribs and accuracy of the calculation of the coordinate transformation.

In the first and second exemplary embodiments, the first and second feature position acquisition units 1020 and 1040 acquire the body surface positions near the sternum and ribs of the subject in each of the MRI image coordinate system and the sensor coordinate system, and the transformation rule calculation unit 1050 calculates the relationship (the coordinate transformation) between the coordinate systems. However, embodiments of the present invention are not limited to such exemplary embodiments. For example, the information processing apparatus 100 does not necessarily acquire the body surface positions near the ribs of the subject.

According to a third exemplary embodiment of the present invention, first, the information processing apparatus 100 acquires the body surface positions near the sternum of the subject in each of the MRI image coordinate system and the sensor coordinate system and the forward direction of the subject. Next, the information processing apparatus 100 calculates the relationship (the coordinate transformation) between the coordinate systems. The processing system according to the third exemplary embodiment has a configuration similar to that according to the first exemplary embodiment, description thereof will not be repeated. However, the third exemplary embodiment differs from the first exemplary embodiment in that the main memory 212 stores a program for executing the processes in the flow charts in FIGS. 12 and 13.

Figure 12:
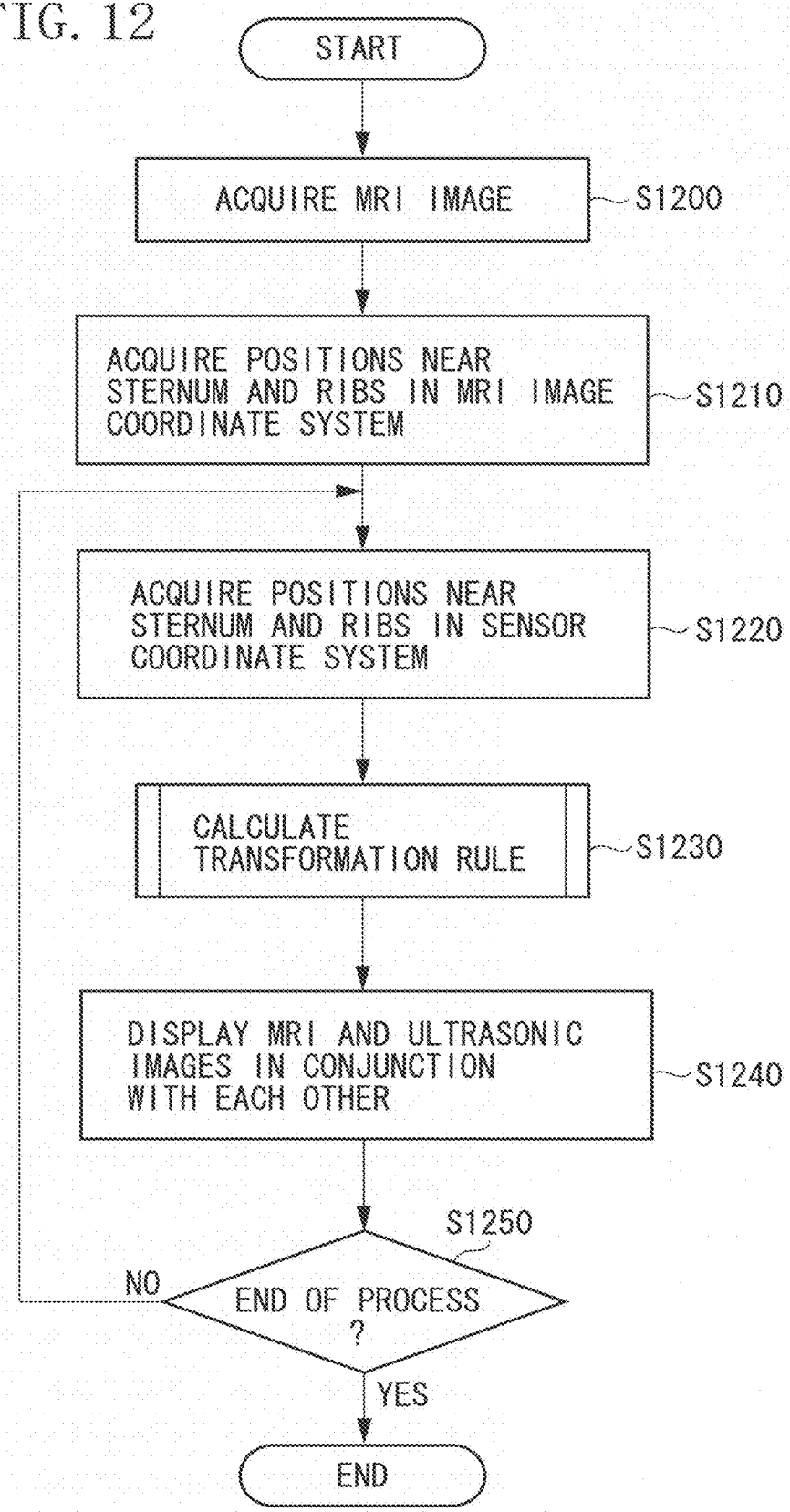
FIG. 12 is a flow chart illustrating a process executed by a diagnostic imaging system according to a third exemplary embodiment of the present invention.

A process executed by the diagnostic imaging system 1 will be described with reference to the flow chart in FIG. 12. Since step S1200 is similar to step S500 according to the first exemplary embodiment, description thereof will not be repeated.

In step S1210, the first feature position acquisition unit 1020 acquires the body surface positions near the sternum and the forward direction of the subject displayed in the MRI image. Since the acquisition of the body surface positions near the sternum is similar to that according to the first exemplary embodiment, detailed description thereof will not be repeated. The first feature position acquisition unit 1020 records the body surface positions near the upper and lower sternum ends in the MRI image coordinate system as the positions $p_{M1}$ and $p_{M2}$.

Next, the acquisition of the forward direction of the subject will be described. The forward direction of the subject is a line extending from the back side toward the front side of the subject and is the upward direction in an axial cross-sectional image accurately captured with respect to the orientation of the subject. In an axial cross section, normally, a human body as a subject is approximately symmetrical (mirror image) about a straight line going through the center of the subject in the forward direction.

According to the third exemplary embodiment, the user examines an MRI tomographic image and uses the mouse 150 or the like, and the first feature position acquisition unit 1020 acquires the forward direction in the image. The first feature position acquisition unit 1020 acquires and records the forward direction as a unit vector $v_M$ in the MRI image coordinate system. The forward direction of the subject is not necessarily acquired based on user instructions. For example, the first feature position acquisition unit 1020 may acquire the orientation of the subject rendered in the MRI image from information, such as a digital-imaging-and-communications-in-medicine (DICOM) header, associated with the MRI image. In this way, based on the acquired orientation of the subject, the first feature position acquisition unit 1020 can acquire the forward direction of the subject.

In step S1220, the second feature position acquisition unit 1040 acquires the body surface positions near the sternum of the subject and a symmetry axis of the subject in the sensor coordinate system. Since the acquisition of the body surface positions near the sternum is similar to that according to the first exemplary embodiment, detailed description thereof will not be repeated. The second feature position acquisition unit 1040 records the body surface positions near the upper and lower sternum ends in the sensor coordinate system as the positions $p_{U1}$ and $p_{U2}$.

Next, the acquisition of the symmetry axis of the subject will be described. For example, the second feature position acquisition unit 1040 can acquire the forward direction of the subject in the sensor coordinate system, based on the orientation of the ultrasonic probe, when acquiring the body surface positions near the sternum. Namely, the user brings the ultrasonic probe into contact with the body surface positions near the sternum, so that the direction in which the ultrasonic beam is emitted from the ultrasonic probe (the y axis in the probe coordinate system) is approximately perpendicular to the body surface of the subject. The direction along the y axis in the probe coordinate system is transformed into the direction in the sensor coordinate system, and the transformed direction is acquired and recorded as a unit vector $v_U$ representing the direction in the sensor coordinate system.

In this process, the second feature position acquisition unit 1040 does not necessarily acquire the forward direction of the subject based on the orientation of the ultrasonic probe. For example, if a subject is inspected in a supine position, the upward direction of the bed on which the subject lies may be aligned in advance with an arbitrary axis direction as the measurement reference of the position and orientation measurement apparatus 130. In this way, regardless of the measurement values of the position and orientation of the ultrasonic probe, the unit vector $v_U$ in the arbitrary axis direction can be acquired.

In step S1230, the transformation rule calculation unit 1050 calculates a transformation rule relating to the coordinate transformation between the sensor coordinate system and the MRI image coordinate system. Since steps S1240 and S1250 are similar to steps S540 and S550 according to the first exemplary embodiment, description thereof will not be repeated.

Next, step S1230 will be described in detail with reference to the flowchart in FIG. 13. The transformation rule calculation unit 1050 executes step S1231 in the same way as in step S531 according to the first exemplary embodiment, to calculate the rigid transformation matrix $M_1$. Next, the transformation rule calculation unit 1050 executes rigid transformation on the body surface positions $p_{U1}$ and $p_{U2}$ near the sternum acquired in step S1220, to calculate positions $p_{U1}'$ and $p_{U2}'$.

The transformation rule calculation unit 1050 executes step S1232 in the same way as in step S532 according to the first exemplary embodiment, to calculate the rigid transformation matrix $M_2$. Next, the transformation rule calculation unit 1050 executes rigid transformation on the body surface positions $p_{U1}'$ and $p_{U2}'$ near the sternum acquired in step S1231, to calculate positions $p_{U1}''$ and $p_{U2}''$. In addition, the transformation rule calculation unit 1050 executes rigid transformation on the forward direction $v_U$ of the subject, to calculate a direction $v_U''$.

In step S1233, the transformation rule calculation unit 1050 executes the following process. Namely, based on the body surface positions near the sternum and the forward direction of the subject in the MRI image coordinate system and based on the body surface positions near the sternum and ribs and the forward direction of the subject calculated in step S1232, the transformation rule calculation unit 1050 calculates the coordinate transformation for correcting rotation about the sternum axis. This coordinate transformation enables rotation with a straight line connecting the positions $p_{U1}''$ and $p_{U2}''$ as the axis and enables approximate alignment of the direction $v_U''$ and the vector $v_M$. The transformation rule calculation unit 1050 can use a publicly known nonlinear optimization method to calculate the coordinate transformation.

The transformation rule calculation unit 1050 calculates the coordinate transformation calculated in the above way, as the rigid transformation matrix $M_3$. Since step S1234 is similar to step S534 according to the first exemplary embodiment, description thereof will not be repeated. Based on the processing system according to the third exemplary embodiment, the information processing apparatus 100 does not acquire the body surface positions near the ribs of the subject, the transformation rule calculation unit 1050 can calculate a transformation rule between the sensor coordinate system and the MRI image coordinate system more easily.

(Variation 3-1)

In the third exemplary embodiment, the first and second feature position acquisition units 1020 and 1040 acquire the body surface positions near the sternum and the forward direction of the subject in the MRI image coordinate system and the sensor coordinate system, and the transformation rule calculation unit 1050 calculates the coordinate transformation between the coordinate systems, to approximately align the positions and the directions. However, the present exemplary embodiment is not limited to such example. For example, the first and second feature position acquisition units 1020 and 1040 do not necessarily acquire the respective forward directions of the subject in the MRI image coordinate system and the sensor coordinate system.

In this case, in step S1233, the transformation rule calculation unit 1050 acquires the MRI image and the ultrasonic image and calculates the coordinate transformation relating to rotation about the sternum axis, based on anatomical features or statistical luminance values in these images. In this way, since the first and second feature position acquisition units 1020 and 1040 do not need to acquire the respective forward directions of the subject in the MRI image coordinate system and the sensor coordinate system, influence by errors that may otherwise be caused when the directions are acquired can be reduced further.

According to the above exemplary embodiment, a plurality of positions based on the sternum, which is easily specified among the other parts of the subject, are specified. Thus, since the position and orientation of the sternum are aligned between the subject and the 3D image, the correspondence relationship between the subject and the 3D image can be acquired effectively and accurately.

In the above exemplary embodiments, an MRI image is used as an example of a 3D medical image. However, as long as the image is a 3D image of a subject, an arbitrary image such as an X-ray CT image or a positron-emission tomography (PET) image is applicable.

In the above exemplary embodiments, by calculating a transformation rule between the MRI image coordinate system and the sensor coordinate system, an MRI image and an ultrasonic image whose position and orientation are measured in the sensor coordinate system are compared and examined. However, embodiments of the present invention are not limited to such exemplary embodiments. A feature of the present embodiment is to obtain a spatial correspondence between or among data such as images, measurement values, or schematic figures of a human body, by using the structure of the sternum, which is an anatomical feature of a human body, as an index. Thus, various modes of the present embodiment are possible as illustrated below.

For example, instead of the ultrasonic probe according to the first exemplary embodiment, a puncture device whose position and orientation are measured in the sensor coordinate system may be used. In this case, for example, if the position of a puncture target is determined in an MRI image in advance, the position or orientation of the puncture device with respect to the target can be presented. In addition, a 3D pointing device whose position and orientation can be measured is also applicable.

In addition, for example, to compare and examine an MRI image with another 3D medical image such as an X-ray CT image, the information processing apparatus 100 may calculate a transformation rule between the MRI image coordinate system and a coordinate system used as a reference by the another 3D medical image. In this case, instead of acquiring the body surface positions near the sternum and ribs of the subject in the sensor coordinate system according to the first exemplary embodiment, the second feature position acquisition unit 1040 acquires the body surface positions near the sternum and ribs of the subject rendered in the another 3D medical image.

In addition, for example, embodiments of the present invention may include spatially aligning an MRI image with a schematic diagram in which a schematic shape of a normal human body is rendered. In this case, the second feature position acquisition unit 1040 acquires information about the positions of the sternum and ribs in a coordinate system as a reference used by the schematic diagram. In this way, the information processing apparatus 100 can acquire the spatial correspondence relationship between the MRI image and the schematic diagram. Further, in this case, for example, the information processing apparatus 100 may acquire a target region such as a lesion location in the MRI image coordinate system and present a corresponding region on the schematic diagram.

In the above exemplary embodiments, embodiments of the present invention are also realized by software and computer hardware. However, a storage medium storing the software is also a component of the embodiments of the present invention. The above information processing apparatus 100 is realized by cooperation of an electronic calculator (computer) including a CPU and software. Some of the function blocks of the information processing apparatus 100 may be realized by circuits, and other blocks may be realized by software. Circuits may be grouped per function block. Alternatively, only a part of the functions may be implemented as a circuit. In addition, embodiments of the present invention may include an information processing system in which the functions of the information processing apparatus 100 are distributed to a plurality of apparatuses.

Embodiments of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-081993 filed Apr. 1, 2011, which is hereby incorporated by reference herein in its entirety.

What is claimed is:

1. An image processing system for medical images, comprising:
   a non-transitory memory that stores executable instructions; and
   at least one processor coupled to the non-transitory memory, wherein responsive to executing the instructions, the at least one processor is configured to:
   acquire a plurality of first positions in a three-dimensional image of a subject as positions of a sternum in the three-dimensional image of the subject;
   acquire a plurality of first body surface positions of the subject as positions of the sternum in the subject;
   calculate a first sternum direction vector as a direction of the sternum in the three-dimensional image based on the plurality of first positions;
   calculate a second sternum direction vector as a direction of the sternum in the subject based on the plurality of first body surface positions; and
   calculate a first correspondence relationship in a position of the sternum between the three-dimensional image and the subject, by (a) matching a first position of the sternum in the three-dimensional image and a first body surface position of the sternum in the body of subject and (b) matching the first sternum direction vector and the second sternum direction vector,
   wherein the at least one processor is configured to further acquire a plurality of second positions in the three-dimensional image of the subject as positions of ribs in the three-dimensional image of the subject,
   wherein the at least one processor is configured to further acquire a plurality of second body surface positions of the subject as positions of the ribs in the subject,
   wherein the at least one processor is configured to further calculate a second correspondence relationship in a direction of rotation with the sternum as an axis between the subject and the three-dimensional image, based on the second positions in the three-dimensional image and the second body surface positions in the subject, and
   wherein the at least one processor is configured to generate a tomographic image on the basis of a cross section in the three-dimensional image, the cross section being specified using the first correspondence relationship and the second correspondence relationship.

2. The image processing system according to claim 1, further comprising a position and orientation measuring apparatus,
   wherein the at least one processor is configured to acquire the plurality of first and/or second body surface positions of the subject, based on a body surface position of the subject measured by the position and orientation measuring apparatus.

3. The image processing system according to claim 2, further comprising an ultrasonic probe,
   wherein the ultrasonic probe includes the position and orientation measuring apparatus, and
   wherein the at least one processor is configured to acquire the plurality of first and/or second body surface positions of the subject, based on a position where an imaging surface of the ultrasonic probe whose position and orientation is measured by the position and orientation measuring apparatus contacts the subject.

4. The image processing system according to claim 1, further comprising an ultrasonic probe,
   wherein the at least one processor is further configured to generate, from the three-dimensional image and based on the calculated first and second correspondence relationships, a tomographic image that corresponds to an ultrasonic image acquired based on a signal acquired by the ultrasonic probe when an imaging surface of the ultrasonic probe contacts the subject.

5. The image processing system according to claim 4, further comprising a display unit,
   wherein the at least one processor is further configured to cause the display unit to display the acquired ultrasonic image and the generated tomographic image.

6. The image processing system according to claim 1, wherein the at least one processor is configured to acquire the plurality of second positions in the three-dimensional image of the subject, based on left and right ribs of the subject.

7. The image processing system according to claim 1, wherein the at least one processor is configured to acquire the plurality of second body surface positions of the subject as the positions of the ribs in the subject based on a right rib and a left rib of the subject,
   wherein the at least one processor is further configured to:
   determine whether at least a pair of one of the second body surface positions acquired based on the right rib and one of the acquired second body surface positions obtained based on the left rib is symmetrical with respect to the acquired position obtained based on the sternum; and
   notify a user of a warning if the at least one processor determines that the pair is not symmetrical.

8. The image processing system according to claim 1, wherein the at least one processor is further configured to:
   determine whether the at least one processor has acquired the plurality of first body surface positions as the positions of the sternum in the subject based on the sternum, and the plurality of second body surface positions obtained based on a left rib and a right rib of the subject; and
   notify a user of a warning if the at least one processor determines that the plurality of first body surface positions and the plurality of second body surface positions have not been acquired.

9. The image processing system according to claim 1, wherein the three-dimensional image is one of a magnetic resonance image, a computed tomography image, and a positron-emission tomography image of the subject.

10. An image processing system for medical images, comprising:
    a non-transitory memory that stores executable instructions; and
    at least one processor coupled to the non-transitory memory, wherein responsive to executing the instructions, the at least one processor is configured to:
    acquire a plurality of first positions in a three-dimensional image of a subject as positions of a sternum in the three-dimensional image of the subject;
    acquire a plurality of first body surface positions of the subject as positions of the sternum in the subject;

calculate a first sternum direction vector as a direction of the sternum in the three-dimensional image based on the plurality of first positions;

calculate a second sternum direction vector as a direction of the sternum in the body of the subject based on the plurality of first body surface positions; and calculate a first correspondence relationship in a position of the sternum between the three-dimensional image and the subject, by (a) matching a first position of the sternum in the three-dimensional image and a first body surface position of the sternum in the body of subject and (b) matching the first sternum direction vector and the second sternum direction vector, wherein the at least one processor is further configured to acquire at least a second position in the three-dimensional image of the subject as a position of second ribs in the three-dimensional image of the subject, wherein the at least one processor is further configured to acquire at least a second body surface position of the subject as a position of the second ribs in the body of the subject, wherein the at least one processor is further configured to calculate a second correspondence relationship between the subject and the three-dimensional image such that the position of the sternum and the first sternum direction vector, in the three-dimensional image of the subject, obtained based on the sternum at the base of the second ribs, acquired by the at least one processor, matches the position of the sternum and the second sternum direction vector, in the subject, obtained based on the base of the second ribs, acquired by the at least one processor, wherein the at least one processor is configured to further acquire at least a position in the three-dimensional image of the subject, as a position of a lower sternum end in the three-dimensional image of the subject, wherein the at least one processor is configured to further acquire at least a body surface position of the subject as a position of the lower sternum end in the body of the subject, wherein the at least one processor is configured to further calculate a third correspondence relationship between the subject and the three-dimensional image such that a direction defined by the position in the three-dimensional image obtained based on the base of the second ribs and the position in the three-dimensional image obtained based on the lower sternum end in the three-dimensional image matches a direction defined by the position of the subject obtained based on the base of the second ribs and the position of the subject obtained based on the lower sternum end of the subject, and wherein the at least one processor is configured to generate a tomographic image on the basis of a cross section in the three-dimensional image, the cross section being specified using the first correspondence relationship and the second correspondence relationship and the third correspondence relationship.

11. An imaging system for medical images, comprising:

an ultrasonic probe configured to acquire a signal from a position of a subject by contacting the position of the subject;

a non-transitory memory that stores executable instructions; and at least one processor coupled to the non-transitory memory, wherein responsive to executing the instructions, the at least one processor is configured to:
  acquire an ultrasonic image based on the signal acquired by the ultrasonic probe;
  acquire a plurality of first positions in a three-dimensional image of the subject as positions of a sternum in the three-dimensional image of the subject;
  acquire a plurality of first body surface positions of the subject as positions of the sternum in the subject, based on the position where the ultrasonic probe contacts the subject;
  calculate a first sternum direction vector as a direction of the sternum in the three-dimensional image based on the plurality of first positions;
  calculate a second sternum direction vector as a direction of the sternum in the subject based on the plurality of first body surface positions;
  calculate a first correspondence relationship in a position of the sternum between the three-dimensional image and the subject, by (a) matching a first position of the sternum in the three-dimensional image and a first body surface position of the sternum in the body of the subject and (b) matching the first sternum direction vector and the second sternum direction vector; and
  generate a tomographic image corresponding to the generated ultrasonic image from the three-dimensional image based on the calculated first correspondence relationship, wherein the at least one processor is configured to further acquire a plurality of second positions in the three-dimensional image of the subject as positions of ribs in the three-dimensional image of the subject, wherein the at least one processor is configured to further acquire a plurality of second body surface positions of the subject as positions of the ribs in the subject, and wherein the at least one processor is configured to further calculate a second correspondence relationship in a direction of rotation with the sternum as an axis between the subject and the three-dimensional image, based on the second positions in the three-dimensional image and the second body surface positions in the subject.

12. A method of processing medical images with an image processing apparatus, the apparatus including at least one processor coupled to a non-transitory memory that stores executable instructions, wherein responsive to executing the instructions, the at least one processor performs the method comprising:

acquiring a plurality of first positions in a three-dimensional image of a subject as positions of a sternum in the three-dimensional image of the subject, and calculating a first sternum direction vector as a direction of the sternum in the three-dimensional image based on the plurality of first positions;

acquiring a plurality of first body surface positions of the subject as positions of the sternum in the subject, and calculating a second sternum direction vector as a direction of the sternum in the subject based on the plurality of first body surface positions; and calculating a first correspondence relationship in a position of the sternum between the subject and the three-dimensional image, by (a) matching a first position of the sternum in the three-dimensional image and a first body surface position of the sternum in the body of the subject and (b) matching the first sternum direction vector and the second sternum direction vector, wherein the at least one processor performs further acquiring a plurality of second positions in the three-dimensional image of the subject as positions of ribs in the three-dimensional image of the subject, wherein the at least one processor performs further acquiring a plurality of second body surface positions of the subject as positions of the ribs in the subject, wherein the at least one processor performs further calculating a second correspondence relationship in a direction of rotation with the sternum as an axis between the subject and the three-dimensional image, based on the second positions in the three-dimensional image and the second body surface positions in the subject, and wherein the at least one processor further performs generating a tomographic image on the basis of a cross section in the three-dimensional image, the cross section being specified using the first correspondence relationship and the second correspondence relationship.

* * * * *